United States Patent
Seto et al.

(10) Patent No.: US 9,206,940 B2
(45) Date of Patent: Dec. 8, 2015

(54) STRUCTURE INCLUDING A FRAME HAVING FOUR SIDES AND A CLOSED CROSS-SECTION STRUCTURAL MEMBER

(71) Applicant: NIPPON STEEL & SUMITOMO METAL CORPORATION, Tokyo (JP)

(72) Inventors: Atsushi Seto, Tokyo (JP); Takashi Matsuno, Tokyo (JP); Eisaku Sakurada, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/561,674

(22) Filed: Dec. 5, 2014

(65) Prior Publication Data

US 2015/0152995 A1    Jun. 4, 2015

Related U.S. Application Data

(62) Division of application No. 13/510,673, filed as application No. PCT/JP2010/071324 on Nov. 30, 2010, now Pat. No. 8,955,284.

(30) Foreign Application Priority Data

Dec. 2, 2009  (JP) ................... 2009-274920
Aug. 24, 2010  (JP) ................... 2010-187241

(51) Int. Cl.
*F16M 1/08* (2006.01)
*B62D 21/11* (2006.01)
*B62D 27/02* (2006.01)

(52) U.S. Cl.
CPC ................. *F16M 1/08* (2013.01); *B62D 21/11* (2013.01); *B62D 27/023* (2013.01); *Y10T 428/17* (2015.01)

(58) Field of Classification Search
CPC .......... E04B 1/5831; E04B 2001/2415; E04B 2/7425; E04B 1/2403; E04B 1/2608; E04B 2001/2684; E04B 2001/2451; Y10T 403/4602; Y10T 403/42; Y10T 403/477; Y10T 403/478; Y10T 428/17; F16M 1/08; F16B 12/46; F16B 12/50; F16B 12/505; F16B 12/52; B62D 21/11; B62D 27/023
USPC ........... 52/656.1, 656.2, 656.4, 656.5, 656.6, 52/656.7, 656.9, 287.1, 255, 631, 657, 52/658; 248/903; 403/41, 42, 335, 336, 403/231; 428/53
See application file for complete search history.

(56) References Cited

U.S. PATENT DOCUMENTS 3,204,905 A * 9/1965 Marban .................. 248/188
3,440,786 A * 4/1969 Weaver .................. 52/780

(Continued)

FOREIGN PATENT DOCUMENTS

CN  1576680  2/2005
CN  101554985  10/2009

(Continued)

OTHER PUBLICATIONS

International Search Report dated Feb. 15, 2011, issued in corresponding PCT Application No. PCT/JP2010/071324.

(Continued)

*Primary Examiner* — James Ference
(74) *Attorney, Agent, or Firm* — Kenyon & Kenyon LLP

(57) ABSTRACT

A structure including a structural member configured like a frame with four sides is disclosed. A closed cross-section structural member serving as a reinforcing material is provided in a crossing corner of the structural member. The closed cross-section structural member includes two horizontal portions separated from each other in a thickness direction of the structural member and extending in an in-plane direction of the structural member and two vertical portions one of which connects first ends of the two horizontal portions together and the other of which connects second ends of the two horizontal portions together. The closed cross-section structural member includes a first opening formed therein facing an inner-peripheral flat surface of the structural member and a second opening formed therein facing inside of the structural member.

4 Claims, 25 Drawing Sheets

(56) References Cited

U.S. PATENT DOCUMENTS

| | | | | |
|---|---|---|---|---|
| 3,606,419 | A * | 9/1971 | Virkler et al. | 52/656.9 |
| 3,669,479 | A * | 6/1972 | Payne | 403/230 |
| 3,782,054 | A * | 1/1974 | Goss, Jr. | 403/295 |
| 4,050,498 | A * | 9/1977 | Lucchetti | 160/374.1 |
| 4,072,433 | A * | 2/1978 | Veyhl | 403/172 |
| 4,124,186 | A * | 11/1978 | Call, Sr. | 248/188 |
| 4,347,015 | A * | 8/1982 | Olashaw | 403/219 |
| 4,570,406 | A * | 2/1986 | DiFazio | 52/656.9 |
| 4,825,621 | A * | 5/1989 | Jensen | 52/702 |
| 4,862,612 | A * | 9/1989 | Sugihara et al. | 40/782 |
| 4,973,187 | A * | 11/1990 | Sauder | 403/205 |
| 5,033,901 | A * | 7/1991 | Dias | 403/172 |
| 5,363,625 | A * | 11/1994 | Philippi | 52/653.2 |
| 5,431,211 | A * | 7/1995 | Guillemet | 160/381 |
| 5,467,570 | A * | 11/1995 | Leek | 52/712 |
| 5,481,835 | A * | 1/1996 | Bloom | 52/98 |
| 5,485,705 | A * | 1/1996 | Guillemet | 52/656.9 |
| 5,737,893 | A * | 4/1998 | Rossiter et al. | 52/481.2 |
| 6,022,165 | A * | 2/2000 | Lin | 403/231 |
| 6,073,412 | A * | 6/2000 | Verch | 52/656.5 |
| 6,141,926 | A * | 11/2000 | Rossiter et al. | 52/239 |
| 6,179,515 | B1 * | 1/2001 | Grieser et al. | 403/402 |
| 6,379,074 | B1 * | 4/2002 | Chin et al. | 403/231 |
| 6,481,177 | B1 * | 11/2002 | Wood | 52/656.9 |
| 6,579,033 | B2 * | 6/2003 | Ajiki | 403/403 |
| 6,857,808 | B1 * | 2/2005 | Sugimoto et al. | 403/41 |
| 6,896,437 | B2 * | 5/2005 | Morgan et al. | 403/188 |
| 7,182,543 | B2 | 2/2007 | Kondo et al. | |
| 2005/0028478 | A1 * | 2/2005 | Kondo et al. | 52/720.1 |
| 2005/0193680 | A1 * | 9/2005 | Wang | 52/656.9 |
| 2007/0125016 | A1 * | 6/2007 | Yu et al. | 52/220.7 |
| 2007/0175163 | A1 * | 8/2007 | Williams et al. | 52/656.1 |
| 2007/0295461 | A1 * | 12/2007 | Kim | 160/381 |
| 2008/0110112 | A1 * | 5/2008 | Yu et al. | 52/239 |
| 2008/0131197 | A1 * | 6/2008 | Hamlen | 403/231 |
| 2008/0295443 | A1 * | 12/2008 | Simmons | 52/655.1 |
| 2012/0231200 | A1 * | 9/2012 | Seto et al. | 428/53 |

FOREIGN PATENT DOCUMENTS

| | | |
|---|---|---|
| JP | 9-118257 | 5/1997 |
| JP | 2001-132102 | 5/2001 |
| JP | 2002-120754 | 4/2002 |
| JP | 2003-193561 | 7/2003 |
| JP | 2004-299699 | 10/2004 |
| JP | 2005-054565 | 3/2005 |
| JP | 2006-002464 | 1/2006 |
| JP | 2006-052582 | 2/2006 |
| JP | 2006-063787 | 3/2006 |
| KR | 20050012160 | 1/2005 |
| KR | 20080028103 | 3/2008 |

OTHER PUBLICATIONS

International Preliminary Report on Patentability dated Jul. 19, 2012 issued in corresponding PCT Application No. PCT/JP2010/071324.
European Search Report dated Apr. 10, 2013, issued in corresponding European Application No. 10834543.0.
Office Action dated Jul. 8, 2013 issued in corresponding Korean Application No. 10-2012-7013251.
Office Action dated Dec. 4, 2013 issued in corresponding Chinese Application No. 201080054323.9 [With English Summary of Office Action].

* cited by examiner

F I G. 3
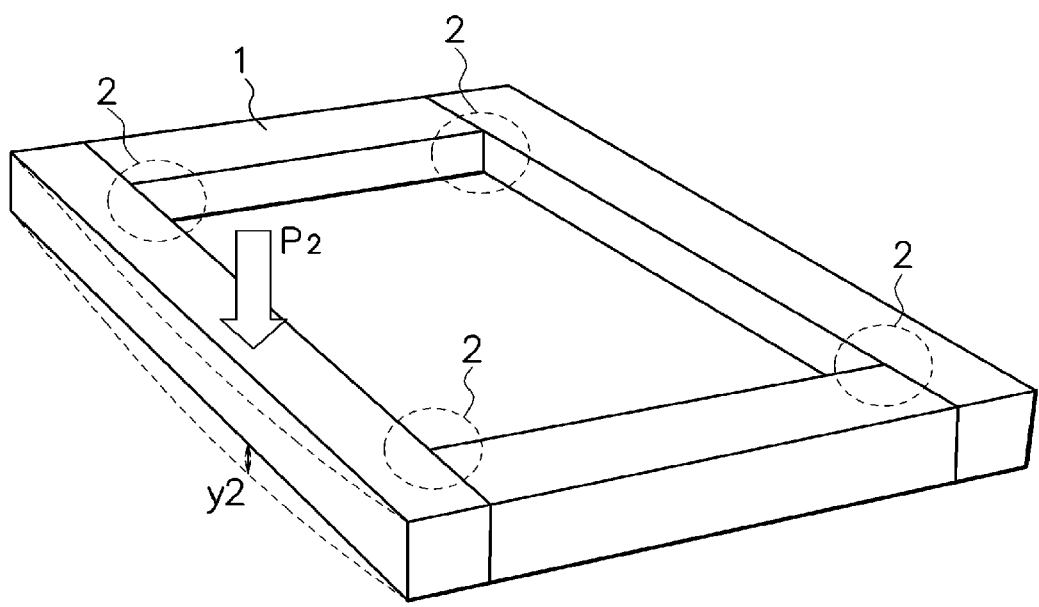

F I G. 4
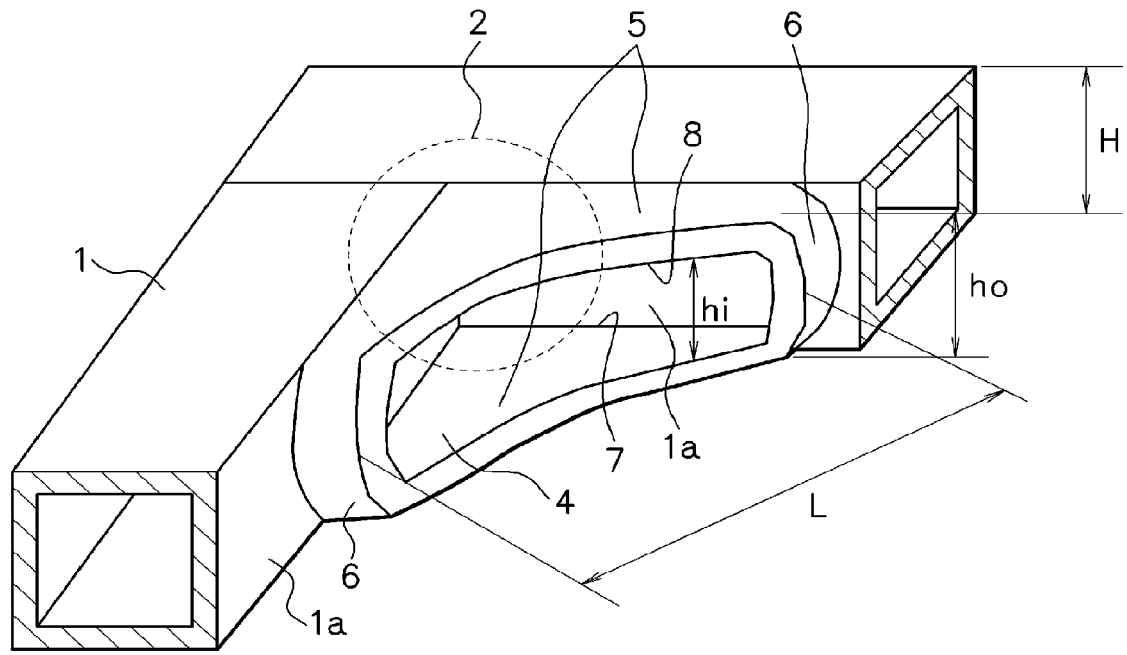

F I G. 5A
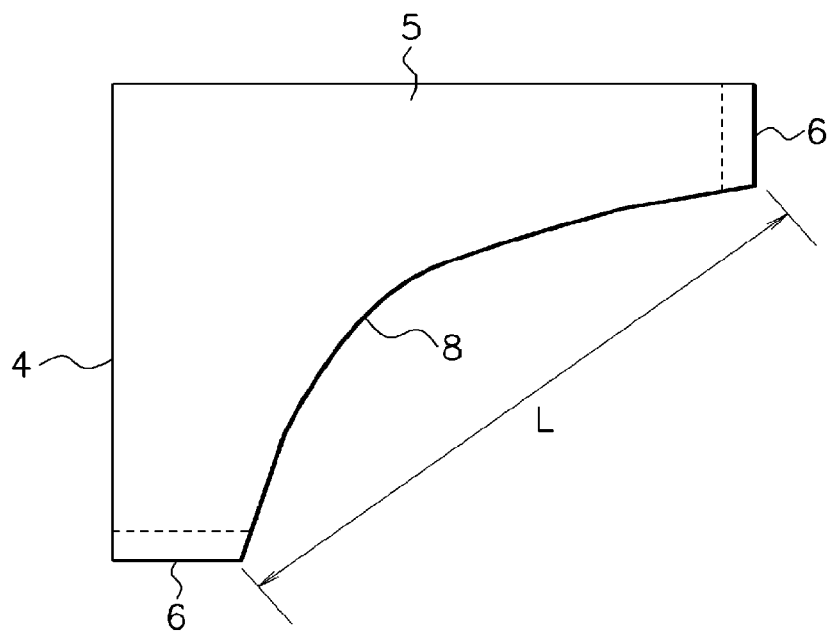
F I G. 5B
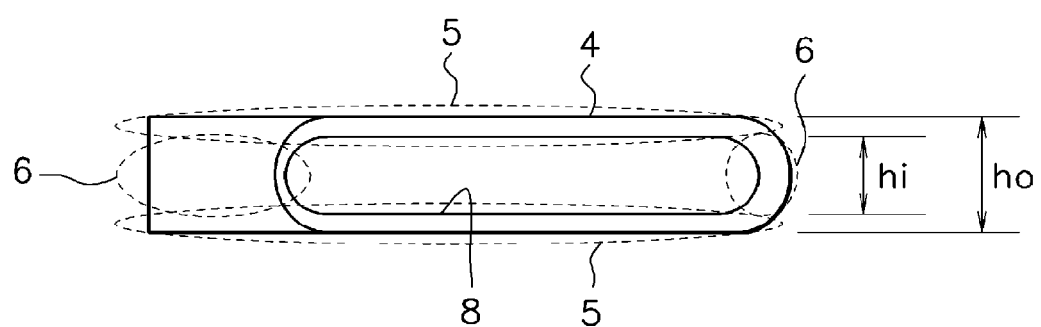

F I G. 6
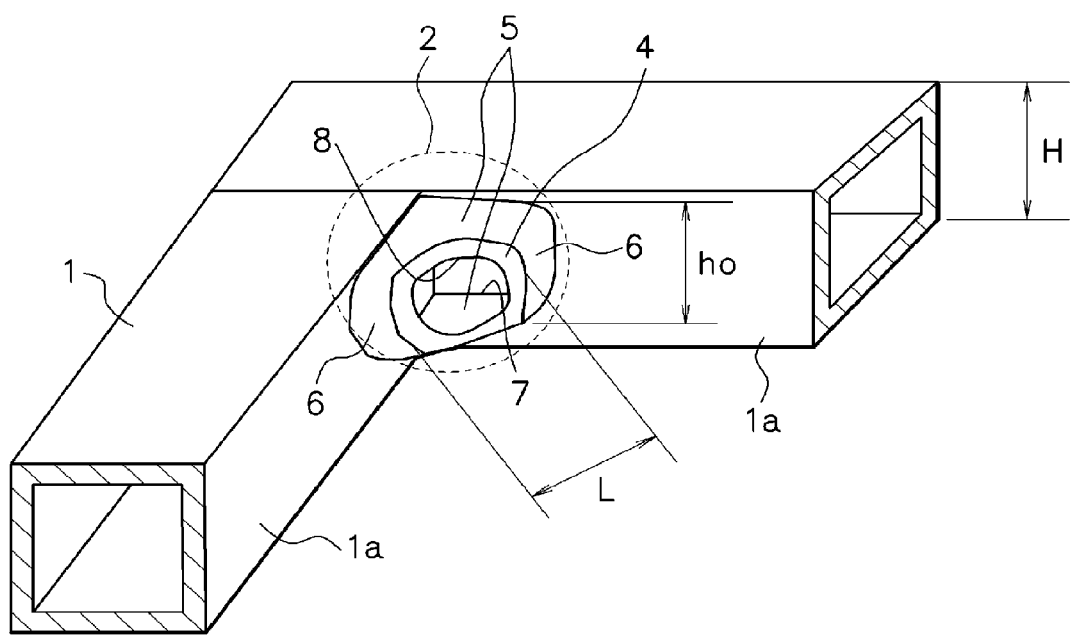

F I G. 7
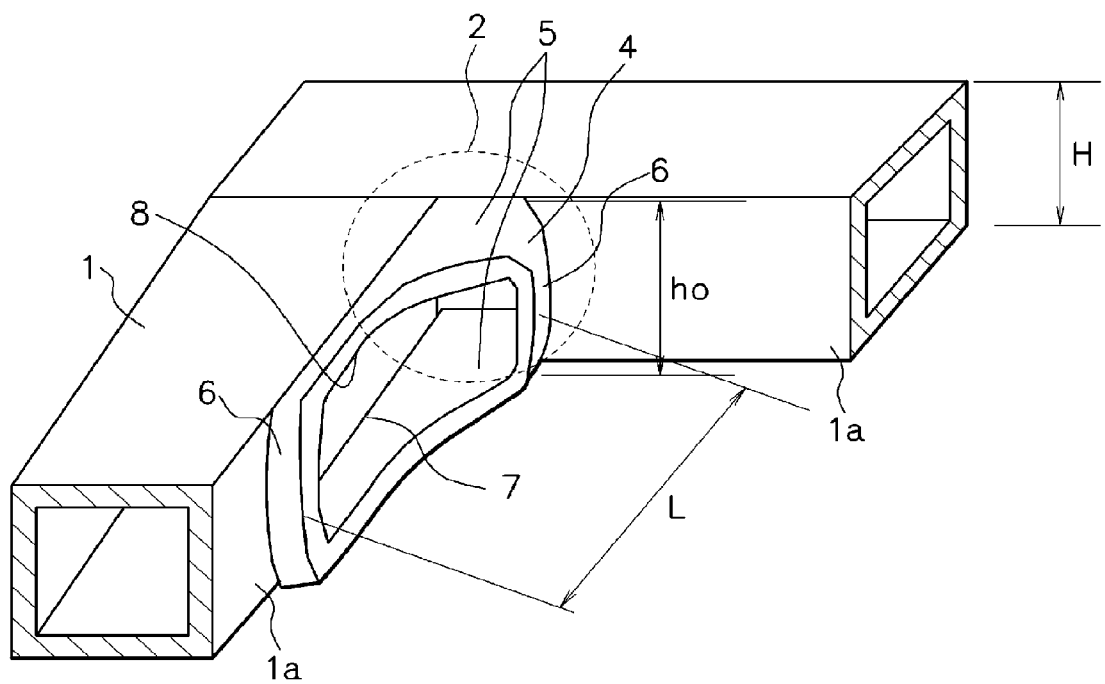

F I G. 10
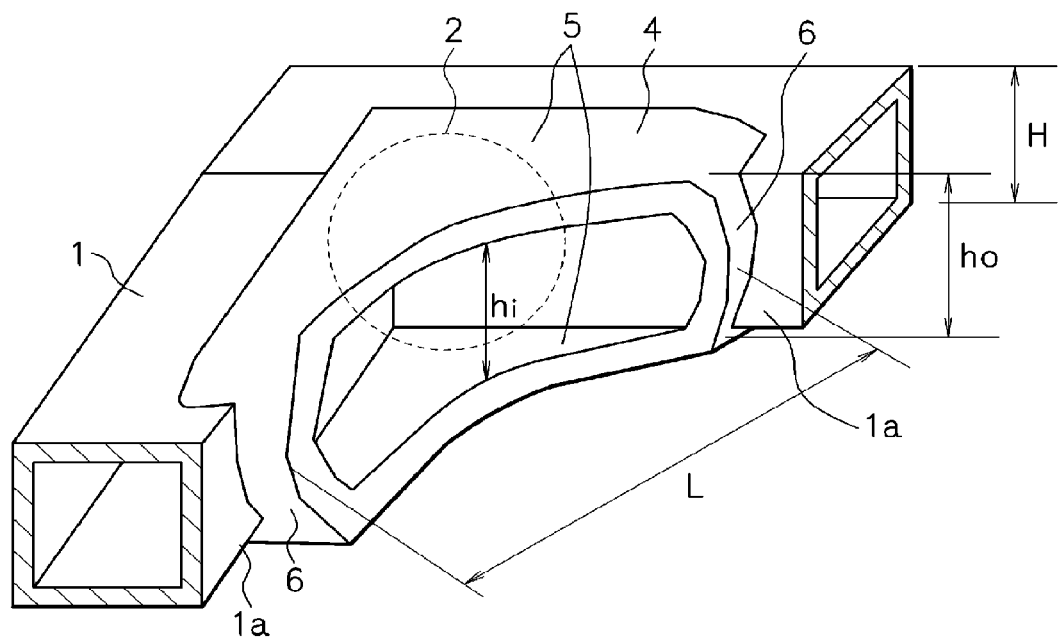
F I G. 11
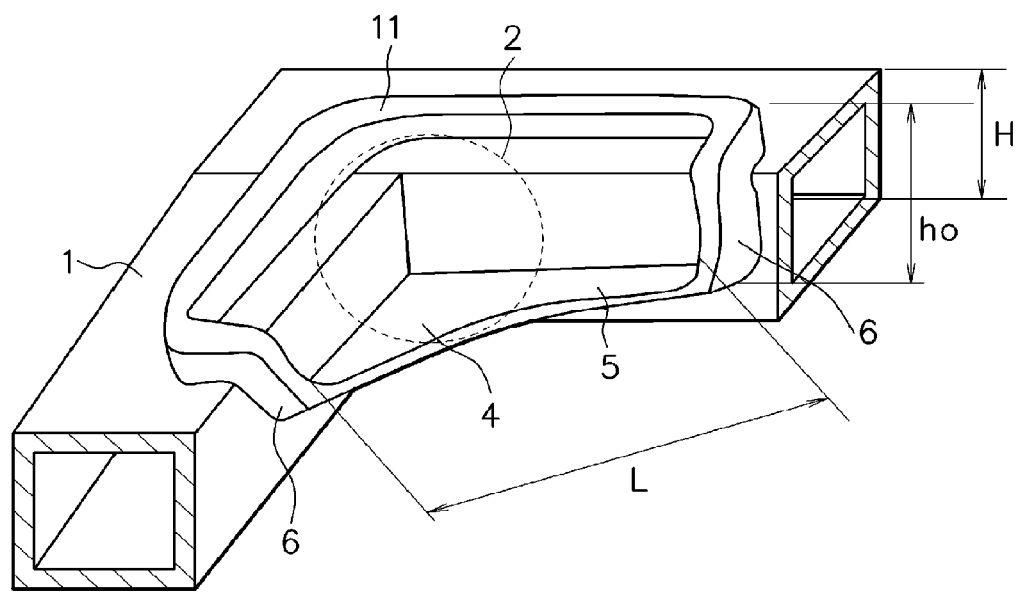

FIG. 22

| NO. | REINFORCING MATERIAL | MAXIMUM WIDTH OF OPENING IN REINFORCING MATERIAL (mm) | LENGTH OF REINFORCING MATERIAL ALONG STRUCTURAL MEMBER (mm) | HEIGHT OF STRUCTURAL MEMBER (mm) | HEIGHT OF REINFORCING MATERIAL*2 (mm) | FLATTENING REINFORCING MATERIAL | INNER HEIGHT OF REINFORCING MATERIAL*3 (mm) | DEFLECTION OF STRUCTURAL MEMBER UNDER LOAD P1*4 (mm) | DEFLECTION REDUCTION RATE FOR LOAD P1*5 (%) | DEFLECTION OF STRUCTURAL MEMBER UNDER LOAD P1 2*6 (%) | DEFLECTION OF STRUCTURAL MEMBER UNDER LOAD P2*7 (mm) | DEFLECTION REDUCTION RATE FOR LOAD P2 1*8 (%) | DEFLECTION REDUCTION RATE FOR LOAD P2 2*9 (%) | REMARK |
|---|---|---|---|---|---|---|---|---|---|---|---|---|---|---|
| 1 | ONE TRIANGULAR RIB | 70 | 69 | 80 | — | — | — | 0.390 | — | — | 0.463 | — | — | COMPARATIVE EXAMPLE |
| 2 | ONE TRIANGULAR RIB | 79 | 75 | 80 | — | — | — | 0.361 | — | — | 0.450 | — | — | COMPARATIVE EXAMPLE |
| 3 | ONE TRIANGULAR RIB | 105 | 95 | 80 | — | — | — | 0.342 | — | — | 0.434 | — | — | COMPARATIVE EXAMPLE |
| 4 | ONE TRIANGULAR RIB | 115 | 100 | 80 | — | — | — | 0.330 | — | — | 0.430 | — | — | COMPARATIVE EXAMPLE |
| 5 | ONE TRIANGULAR RIB | 171 | 140 | 80 | — | — | — | 0.267 | — | — | 0.415 | — | — | COMPARATIVE EXAMPLE |
| 6 | ONE TRIANGULAR RIB | 210 | 168 | 80 | — | — | — | 0.241 | — | — | 0.401 | — | — | COMPARATIVE EXAMPLE |
| 7 | ONE TRIANGULAR RIB | 220 | 175 | 80 | — | — | — | 0.233 | — | — | 0.385 | — | — | COMPARATIVE EXAMPLE |
| 101 | TWO TRIANGULAR RIB | 70 | 69 | 80 | 70.8 | 0.99 | 66.2 | 0.379 | — | — | 0.448 | — | — | COMPARATIVE EXAMPLE |
| 102 | CLOSED CROSS-SECTION STRUCTURAL MEMBER | 70 | 69 | 80 | 70.8 | 0.99 | 66.2 | 0.369 | 5.5 | 2.8 | 0.437 | 5.7 | 2.6 | REFERENCE EXAMPLE |
| 103 | TWO TRIANGULAR RIB | 79 | 75 | 80 | 70.8 | 1.12 | 66.2 | 0.346 | — | — | 0.427 | — | — | COMPARATIVE EXAMPLE |
| 104 | CLOSED CROSS-SECTION STRUCTURAL MEMBER | 79 | 75 | 80 | 70.8 | 1.12 | 66.2 | 0.333 | 7.8 | 3.8 | 0.411 | 8.6 | 3.6 | EXAMPLE OF PRESENT INVENTION |

FIG. 22 (cont.)

| NO. | REINFORCING MATERIAL | MAXIMUM WIDTH OF OPENING IN REINFORCING MATERIAL (mm) | LENGTH OF REINFORCING MATERIAL ALONG STRUCTURAL MEMBER (mm) | HEIGHT OF STRUCTURAL MEMBER (mm) | HEIGHT OF REINFORCING MATERIAL*2 (mm) | FLATTENING*3 (mm) | INNER HEIGHT OF REINFORCING MATERIAL (mm) | DEFLECTION OF STRUCTURAL MEMBER UNDER LOAD P1*4 (mm) | DEFLECTION REDUCTION RATE FOR LOAD P1*5 (%) | DEFLECTION REDUCTION RATE FOR LOAD P1 2*6 (%) | DEFLECTION OF STRUCTURAL MEMBER UNDER LOAD P2*7 (mm) | DEFLECTION REDUCTION RATE FOR LOAD P2 1*8 (%) | DEFLECTION REDUCTION RATE FOR LOAD P2 2*9 (%) | REMARK |
|---|---|---|---|---|---|---|---|---|---|---|---|---|---|---|
| 105 | TWO TRIANGULAR RIB | 105 | 95 | 80 | 70.8 | 1.48 | 66.2 | 0.325 | – | – | 0.409 | – | – | COMPARATIVE EXAMPLE |
| 106 | CLOSED CROSS-SECTION STRUCTURAL MEMBER | 105 | 95 | 80 | 70.8 | 1.48 | 66.2 | 0.308 | 9.7 | 5.0 | 0.394 | 9.2 | 3.6 | EXAMPLE OF PRESENT INVENTION |
| 107 | TWO TRIANGULAR RIB | 115 | 100 | 80 | 70.8 | 1.62 | 66.2 | 0.309 | – | – | 0.387 | – | – | COMPARATIVE EXAMPLE |
| 108 | CLOSED CROSS-SECTION STRUCTURAL MEMBER | 115 | 100 | 80 | 70.8 | 1.62 | 66.2 | 0.289 | 12.4 | 6.5 | 0.364 | 15.4 | 5.8 | EXAMPLE OF PRESENT INVENTION |
| 109 | TWO TRIANGULAR RIB | 171 | 140 | 80 | 70.8 | 2.42 | 66.2 | 0.251 | – | – | 0.378 | – | – | COMPARATIVE EXAMPLE |
| 110 | CLOSED CROSS-SECTION STRUCTURAL MEMBER | 171 | 140 | 80 | 70.8 | 2.42 | 66.2 | 0.231 | 13.3 | 7.6 | 0.352 | 15.1 | 6.2 | EXAMPLE OF PRESENT INVENTION |
| 111 | TWO TRIANGULAR RIB | 210 | 168 | 80 | 70.8 | 2.97 | 66.2 | 0.227 | – | – | 0.363 | – | – | COMPARATIVE EXAMPLE |
| 112 | CLOSED CROSS-SECTION STRUCTURAL MEMBER | 210 | 168 | 80 | 70.8 | 2.97 | 66.2 | 0.211 | 12.5 | 7.2 | 0.342 | 14.8 | 5.8 | EXAMPLE OF PRESENT INVENTION |
| 113 | TWO TRIANGULAR RIB | 220 | 175 | 80 | 70.8 | 3.11 | 66.2 | 0.220 | – | – | 0.354 | – | – | COMPARATIVE EXAMPLE |
| 114 | CLOSED CROSS-SECTION STRUCTURAL MEMBER | 220 | 175 | 80 | 70.8 | 3.11 | 66.2 | 0.209 | 10.2 | 4.9 | 0.340 | 11.0 | 3.9 | REFERENCE EXAMPLE |

FIG. 23

| NO. | REINFORCING MATERIAL | MAXIMUM WIDTH OF OPENING IN REINFORCING MATERIAL (mm) | LENGTH OF REINFORCING MATERIAL ALONG STRUCTURAL MEMBER (mm) | HEIGHT OF STRUCTURAL MEMBER (mm) | HEIGHT OF REINFORCING MATERIAL *2 (mm) | FLATTENING *3 | INNER HEIGHT OF REINFORCING MATERIAL (mm) | DEFLECTION OF STRUCTURAL MEMBER UNDER LOAD P1 *4 (mm) | DEFLECTION REDUCTION RATE FOR LOAD P1 *5 (%) | DEFLECTION OF STRUCTURAL MEMBER UNDER LOAD P2 *6 (mm) | DEFLECTION REDUCTION RATE FOR LOAD P2 *7 (%) | DEFLECTION OF STRUCTURAL MEMBER UNDER LOAD P2 1*8 (%) | DEFLECTION REDUCTION RATE FOR LOAD P2 2*9 (%) | REMARK |
|---|---|---|---|---|---|---|---|---|---|---|---|---|---|---|
| 1 | ONE TRIANGULAR RIB | 70 | 72 | 80 | — | — | — | 0.390 | — | 0.463 | — | — | — | COMPARATIVE EXAMPLE |
| 2 | ONE TRIANGULAR RIB | 79 | 75 | 80 | — | — | — | 0.361 | — | 0.450 | — | — | — | COMPARATIVE EXAMPLE |
| 3 | ONE TRIANGULAR RIB | 105 | 95 | 80 | — | — | — | 0.342 | — | 0.434 | — | — | — | COMPARATIVE EXAMPLE |
| 4 | ONE TRIANGULAR RIB | 115 | 100 | 80 | — | — | — | 0.330 | — | 0.430 | — | — | — | COMPARATIVE EXAMPLE |
| 5 | ONE TRIANGULAR RIB | 171 | 140 | 80 | — | — | — | 0.267 | — | 0.415 | — | — | — | COMPARATIVE EXAMPLE |
| 7 | ONE TRIANGULAR RIB | 220 | 175 | 80 | — | — | — | 0.233 | — | 0.385 | — | — | — | COMPARATIVE EXAMPLE |
| 8 | ONE TRIANGULAR RIB | 230 | 182 | 80 | — | — | — | 0.230 | — | 0.373 | — | — | — | COMPARATIVE EXAMPLE |
| 201 | TWO TRIANGULAR RIB | 70 | 72 | 80 | 75.4 | 0.93 | 70.8 | 0.379 | — | 0.432 | — | — | — | COMPARATIVE EXAMPLE |
| 202 | CLOSED CROSS-SECTION STRUCTURAL MEMBER | 70 | 72 | 80 | 75.4 | 0.93 | 70.8 | 0.366 | 6.1 | 0.419 | 3.4 | 9.5 | 2.9 | REFERENCE EXAMPLE |
| 203 | TWO TRIANGULAR RIB | 79 | 75 | 80 | 75.4 | 1.05 | 70.8 | 0.346 | — | 0.415 | — | — | — | COMPARATIVE EXAMPLE |
| 204 | CLOSED CROSS-SECTION STRUCTURAL MEMBER | 79 | 75 | 80 | 75.4 | 1.05 | 70.8 | 0.333 | 8.6 | 0.398 | 4.7 | 11.6 | 4.4 | EXAMPLE OF PRESENT INVENTION |

F I G. 23 (cont.)

| NO. | REINFORCING MATERIAL | MAXIMUM WIDTH OF REINFORCING OPENING IN REINFORCING MATERIAL (mm) | LENGTH OF REINFORCING MATERIAL ALONG STRUCTURAL MEMBER (mm) | HEIGHT OF STRUCTURAL MEMBER (mm) | HEIGHT OF REINFORCING MATERIAL *2 (mm) | FLATTENING OF REINFORCING MATERIAL *2 | INNER HEIGHT OF REINFORCING MATERIAL *3 (mm) | DEFLECTION OF STRUCTURAL MEMBER UNDER LOAD P1*4 (mm) | DEFLECTION REDUCTION RATE FOR LOAD P1 *5 (%) | DEFLECTION OF STRUCTURAL MEMBER UNDER LOAD P1 2*6 (mm) | DEFLECTION REDUCTION RATE FOR LOAD P1 2*7 (%) | DEFLECTION OF STRUCTURAL MEMBER UNDER LOAD P2 1*8 (mm) | DEFLECTION REDUCTION RATE FOR LOAD P2 2*9 (%) | REMARK |
|---|---|---|---|---|---|---|---|---|---|---|---|---|---|---|
| 205 | TWO TRIANGULAR RIB | 105 | 95 | 80 | 75.4 | 1.39 | 70.8 | 0.326 | — | 0.402 | — | — | — | COMPARATIVE EXAMPLE |
| 206 | CLOSED CROSS-SECTION STRUCTURAL MEMBER | 105 | 95 | 80 | 75.4 | 1.39 | 70.8 | 0.310 | 9.3 | 0.382 | 4.9 | 11.9 | 4.9 | EXAMPLE OF PRESENT INVENTION |
| 207 | TWO TRIANGULAR RIB | 115 | 100 | 80 | 75.4 | 1.53 | 70.8 | 0.307 | — | 0.388 | — | — | — | COMPARATIVE EXAMPLE |
| 208 | CLOSED CROSS-SECTION STRUCTURAL MEMBER | 115 | 100 | 80 | 75.4 | 1.53 | 70.8 | 0.281 | 15.0 | 0.355 | 8.5 | 17.5 | 8.5 | EXAMPLE OF PRESENT INVENTION |
| 209 | TWO TRIANGULAR RIB | 171 | 140 | 80 | 75.4 | 2.27 | 70.8 | 0.252 | — | 0.382 | — | — | — | COMPARATIVE EXAMPLE |
| 210 | CLOSED CROSS-SECTION STRUCTURAL MEMBER | 171 | 140 | 80 | 75.4 | 2.27 | 70.8 | 0.229 | 14.2 | 0.347 | 9.2 | 16.4 | 9.2 | EXAMPLE OF PRESENT INVENTION |
| 211 | TWO TRIANGULAR RIB | 220 | 175 | 80 | 75.4 | 2.92 | 70.8 | 0.223 | — | 0.352 | — | — | — | COMPARATIVE EXAMPLE |
| 212 | CLOSED CROSS-SECTION STRUCTURAL MEMBER | 220 | 175 | 80 | 75.4 | 2.92 | 70.8 | 0.202 | 13.3 | 0.324 | 9.5 | 15.8 | 8.0 | EXAMPLE OF PRESENT INVENTION |
| 213 | TWO TRIANGULAR RIB | 230 | 182 | 80 | 75.4 | 3.05 | 70.8 | 0.214 | — | 0.345 | — | — | — | COMPARATIVE EXAMPLE |
| 214 | CLOSED CROSS-SECTION STRUCTURAL MEMBER | 230 | 182 | 80 | 75.4 | 3.05 | 70.8 | 0.203 | 11.7 | 0.326 | 5.1 | 12.6 | 5.6 | REFERENCE EXAMPLE |

FIG. 24

| NO. | REINFORCING MATERIAL | MAXIMUM WIDTH OF REINFORCING OPENING IN REINFORCING MATERIAL (mm) | LENGTH OF REINFORCING MATERIAL ALONG STRUCTURAL MEMBER (mm) | HEIGHT OF STRUCTURAL MEMBER (mm) | HEIGHT OF REINFORCING MATERIAL*2 (mm) | FLATTENING*3 | INNER HEIGHT OF REINFORCING MATERIAL (mm) | DEFLECTION OF STRUCTURAL MEMBER UNDER LOAD P1*4 (mm) | DEFLECTION REDUCTION RATE FOR LOAD P1*5 (%) | DEFLECTION OF STRUCTURAL MEMBER UNDER LOAD P1 2*6 (mm) | DEFLECTION REDUCTION RATE FOR LOAD P1 2*6 (%) | DEFLECTION OF STRUCTURAL MEMBER UNDER LOAD P2*7 (mm) | DEFLECTION REDUCTION RATE FOR LOAD P2*8 (%) | DEFLECTION REDUCTION RATE FOR LOAD P2 2*9 (%) | REMARK |
|---|---|---|---|---|---|---|---|---|---|---|---|---|---|---|---|
| 2 | ONE TRIANGULAR RIB | 79 | 75 | 80 | — | — | — | 0.361 | — | — | — | 0.463 | — | — | COMPARATIVE EXAMPLE |
| 9 | ONE TRIANGULAR RIB | 85 | 80 | 80 | — | — | — | 0.354 | — | — | — | 0.452 | — | — | COMPARATIVE EXAMPLE |
| 4 | ONE TRIANGULAR RIB | 115 | 100 | 80 | — | — | — | 0.330 | — | — | — | 0.430 | — | — | COMPARATIVE EXAMPLE |
| 10 | ONE TRIANGULAR RIB | 120 | 105 | 80 | — | — | — | 0.318 | — | — | — | 0.426 | — | — | COMPARATIVE EXAMPLE |
| 5 | ONE TRIANGULAR RIB | 171 | 140 | 80 | — | — | — | 0.267 | — | — | — | 0.415 | — | — | COMPARATIVE EXAMPLE |
| 11 | ONE TRIANGULAR RIB | 240 | 190 | 80 | — | — | — | 0.222 | — | — | — | 0.368 | — | — | COMPARATIVE EXAMPLE |
| 12 | ONE TRIANGULAR RIB | 250 | 200 | 80 | — | — | — | 0.210 | — | — | — | 0.355 | — | — | COMPARATIVE EXAMPLE |
| 301 | TWO TRIANGULAR RIB | 79 | 75 | 80 | 80.8 | 0.99 | 75.4 | 0.347 | — | — | — | 0.428 | — | — | COMPARATIVE EXAMPLE |
| 302 | CLOSED CROSS-SECTION STRUCTURAL MEMBER | 79 | 75 | 80 | 80.8 | 0.99 | 75.4 | 0.324 | 10.2 | — | 6.6 | 0.402 | 13.2 | 6.0 | REFERENCE EXAMPLE |
| 303 | TWO TRIANGULAR RIB | 85 | 80 | 80 | 80.8 | 1.06 | 75.4 | 0.336 | — | — | — | 0.407 | — | — | COMPARATIVE EXAMPLE |
| 304 | CLOSED CROSS-SECTION STRUCTURAL MEMBER | 85 | 80 | 80 | 80.8 | 1.06 | 75.4 | 0.309 | 12.7 | — | 7.9 | 0.378 | 16.4 | 7.1 | EXAMPLE OF PRESENT INVENTION |

F I G. 24 (cont.)

| NO. | REINFORCING MATERIAL | MAXIMUM WIDTH OF OPENING IN REINFORCING MATERIAL(mm) | LENGTH OF REINFORCING MATERIAL ALONG STRUCTURAL MEMBER(mm) | HEIGHT OF STRUCTURAL MEMBER (mm) | HEIGHT OF REINFORCING MATERIAL*2 (mm) | FLATTENING REINFORCING MATERIAL*2 | INNER HEIGHT OF REINFORCING MATERIAL*3 (mm) | DEFLECTION OF STRUCTURAL MEMBER UNDER LOAD P1*4 (mm) | DEFLECTION REDUCTION RATE FOR LOAD P1 1*5 (%) | DEFLECTION REDUCTION RATE FOR LOAD P1 2*6 (%) | DEFLECTION OF STRUCTURAL MEMBER UNDER LOAD P2*7 (mm) | DEFLECTION REDUCTION RATE FOR LOAD P2 1*8 (%) | DEFLECTION REDUCTION RATE FOR LOAD P2 2*9 (%) | REMARK |
|---|---|---|---|---|---|---|---|---|---|---|---|---|---|---|
| 305 | TWO TRIANGULAR RIB | 115 | 100 | 80 | 80.0 | 1.44 | 75.4 | 0.255 | — | — | 0.374 | — | — | COMPARATIVE EXAMPLE |
| 306 | CLOSED CROSS-SECTION STRUCTURAL MEMBER | 115 | 100 | 80 | 80.0 | 1.44 | 75.4 | 0.233 | 12.9 | 6.9 | 0.344 | 17.0 | 7.8 | EXAMPLE OF PRESENT INVENTION |
| 307 | TWO TRIANGULAR RIB | 120 | 105 | 80 | 80.0 | 1.50 | 75.4 | 0.294 | — | — | 0.382 | — | — | COMPARATIVE EXAMPLE |
| 308 | CLOSED CROSS-SECTION STRUCTURAL MEMBER | 120 | 105 | 80 | 80.0 | 1.50 | 75.4 | 0.253 | 20.5 | 14.0 | 0.329 | 22.7 | 13.8 | EXAMPLE OF PRESENT INVENTION |
| 309 | TWO TRIANGULAR RIB | 171 | 140 | 80 | 80.0 | 2.14 | 75.4 | 0.250 | — | — | 0.364 | — | — | COMPARATIVE EXAMPLE |
| 310 | CLOSED CROSS-SECTION STRUCTURAL MEMBER | 171 | 140 | 80 | 80.0 | 2.14 | 75.4 | 0.209 | 21.6 | 16.3 | 0.312 | 24.9 | 14.3 | EXAMPLE OF PRESENT INVENTION |
| 311 | TWO TRIANGULAR RIB | 240 | 190 | 80 | 80.0 | 3.00 | 75.4 | 0.212 | — | — | 0.328 | — | — | COMPARATIVE EXAMPLE |
| 312 | CLOSED CROSS-SECTION STRUCTURAL MEMBER | 240 | 190 | 80 | 80.0 | 3.00 | 75.4 | 0.176 | 20.7 | 17.1 | 0.275 | 25.2 | 16.0 | EXAMPLE OF PRESENT INVENTION |
| 313 | TWO TRIANGULAR RIB | 250 | 200 | 80 | 80.0 | 3.13 | 75.4 | 0.202 | — | — | 0.322 | — | — | COMPARATIVE EXAMPLE |
| 314 | CLOSED CROSS-SECTION STRUCTURAL MEMBER | 250 | 200 | 80 | 80.0 | 3.13 | 75.4 | 0.179 | 14.9 | 11.5 | 0.289 | 18.7 | 10.3 | REFERENCE EXAMPLE |

FIG. 25

| NO. | REINFORCING MATERIAL | MAXIMUM WIDTH OF OPENING IN REINFORCING MATERIAL(mm) | LENGTH OF REINFORCING MATERIAL ALONG STRUCTURAL MEMBER(mm) | HEIGHT OF STRUCTURAL MEMBER (mm) | HEIGHT OF REINFORCING MATERIAL*2 (mm) | FLATTENING OF REINFORCING MATERIAL*2 | INNER HEIGHT OF REINFORCING MATERIAL*3 (mm) | DEFLECTION OF STRUCTURAL MEMBER UNDER LOAD P1*4 (mm) | DEFLECTION REDUCTION RATE FOR LOAD P1*5 (%) | DEFLECTION OF STRUCTURAL MEMBER UNDER LOAD P2*6 (%) | DEFLECTION OF STRUCTURAL MEMBER UNDER LOAD P2*7 (mm) | DEFLECTION REDUCTION RATE FOR LOAD P2*8 (%) | DEFLECTION REDUCTION RATE FOR LOAD P2*9 (%) | REMARK |
|---|---|---|---|---|---|---|---|---|---|---|---|---|---|---|
| 2 | ONE TRIANGULAR RIB | 79 | 75 | 80 | – | – | – | 0.361 | – | – | 0.450 | – | – | COMPARATIVE EXAMPLE |
| 13 | ONE TRIANGULAR RIB | 90 | 85 | 80 | – | – | – | 0.354 | – | – | 0.452 | – | – | COMPARATIVE EXAMPLE |
| 10 | ONE TRIANGULAR RIB | 120 | 100 | 80 | – | – | – | 0.330 | – | – | 0.430 | – | – | COMPARATIVE EXAMPLE |
| 14 | ONE TRIANGULAR RIB | 130 | 115 | 80 | – | – | – | 0.330 | – | – | 0.430 | – | – | COMPARATIVE EXAMPLE |
| 5 | ONE TRIANGULAR RIB | 171 | 140 | 80 | – | – | – | 0.267 | – | – | 0.415 | – | – | COMPARATIVE EXAMPLE |
| 11 | ONE TRIANGULAR RIB | 250 | 200 | 80 | – | – | – | 0.210 | – | – | 0.355 | – | – | COMPARATIVE EXAMPLE |
| 15 | ONE TRIANGULAR RIB | 260 | 210 | 80 | – | – | – | 0.206 | – | – | 0.340 | – | – | COMPARATIVE EXAMPLE |
| 401 | TWO TRIANGULAR RIB | 79 | 75 | 80 | 84.6 | 0.93 | 80 | 0.347 | – | – | 0.415 | – | – | COMPARATIVE EXAMPLE |
| 402 | CLOSED CROSS-SECTION STRUCTURAL MEMBER | 79 | 75 | 80 | 84.6 | 0.93 | 80 | 0.323 | 10.5 | 6.9 | 0.385 | 14.4 | 7.1 | REFERENCE EXAMPLE |
| 403 | TWO TRIANGULAR RIB | 90 | 85 | 80 | 84.6 | 1.06 | 80 | 0.337 | – | – | 0.406 | – | – | COMPARATIVE EXAMPLE |
| 404 | CLOSED CROSS-SECTION STRUCTURAL MEMBER | 90 | 85 | 80 | 84.6 | 1.06 | 80 | 0.309 | 12.7 | 8.4 | 0.376 | 16.9 | 7.4 | EXAMPLE OF PRESENT INVENTION |

FIG. 25 (cont.)

| NO. | REINFORCING MATERIAL | MAXIMUM WIDTH OF OPENING IN REINFORCING MATERIAL (mm) | LENGTH OF REINFORCING MATERIAL ALONG STRUCTURAL MEMBER (mm) | HEIGHT OF STRUCTURAL MEMBER (mm) | HEIGHT OF REINFORCING MATERIAL*2 (mm) | FLATTENING OF REINFORCING MATERIAL*3 | INNER HEIGHT OF REINFORCING MATERIAL (mm) | DEFLECTION OF STRUCTURAL MEMBER UNDER LOAD P1*4 (mm) | DEFLECTION REDUCTION RATE FOR LOAD P1*5 (%) | DEFLECTION REDUCTION RATE FOR LOAD P1*6 (%) | DEFLECTION OF STRUCTURAL MEMBER UNDER LOAD P2*7 (mm) | DEFLECTION REDUCTION RATE FOR LOAD P2*8 (%) | DEFLECTION REDUCTION RATE FOR LOAD P2*9 (%) | REMARK |
|---|---|---|---|---|---|---|---|---|---|---|---|---|---|---|
| 405 | TWO TRIANGULAR RIB | 120 | 100 | 80 | 84.6 | 1.42 | 80 | 0.257 | — | — | 0.374 | — | — | COMPARATIVE EXAMPLE |
| 406 | CLOSED CROSS-SECTION STRUCTURAL MEMBER | 120 | 100 | 80 | 84.6 | 1.42 | 80 | 0.233 | 12.9 | 9.5 | 0.345 | 16.9 | 7.7 | EXAMPLE OF PRESENT INVENTION |
| 407 | TWO TRIANGULAR RIB | 130 | 115 | 80 | 84.6 | 1.54 | 80 | 0.307 | — | — | 0.361 | — | — | COMPARATIVE EXAMPLE |
| 408 | CLOSED CROSS-SECTION STRUCTURAL MEMBER | 130 | 115 | 80 | 84.6 | 1.54 | 80 | 0.260 | 21.2 | 15.4 | 0.325 | 24.4 | 14.6 | EXAMPLE OF PRESENT INVENTION |
| 409 | TWO TRIANGULAR RIB | 171 | 140 | 80 | 84.6 | 2.02 | 80 | 0.250 | — | — | 0.366 | — | — | COMPARATIVE EXAMPLE |
| 410 | CLOSED CROSS-SECTION STRUCTURAL MEMBER | 171 | 140 | 80 | 84.6 | 2.02 | 80 | 0.206 | 22.8 | 17.7 | 0.308 | 25.8 | 15.8 | EXAMPLE OF PRESENT INVENTION |
| 411 | TWO TRIANGULAR RIB | 250 | 200 | | 84.6 | 2.96 | 80 | 0.202 | — | — | 0.316 | — | — | COMPARATIVE EXAMPLE |
| 412 | CLOSED CROSS-SECTION STRUCTURAL MEMBER | 250 | 200 | | 84.6 | 2.96 | 80 | 0.154 | 22.0 | 18.9 | 0.261 | 26.5 | 17.4 | EXAMPLE OF PRESENT INVENTION |
| 413 | TWO TRIANGULAR RIB | 260 | 210 | | 84.6 | 3.07 | 80 | 0.198 | — | — | 0.310 | — | — | COMPARATIVE EXAMPLE |
| 414 | CLOSED CROSS-SECTION STRUCTURAL MEMBER | 260 | 210 | | 84.6 | 3.07 | 80 | 0.174 | 15.6 | 12.1 | 0.276 | 18.8 | 11.0 | REFERENCE EXAMPLE |

F I G. 26

| NO. | REINFORCING MATERIAL | MAXIMUM WIDTH OF REINFORCING OPENING IN REINFORCING MATERIAL (mm) | LENGTH OF REINFORCING MATERIAL ALONG STRUCTURAL MEMBER (mm) | HEIGHT OF STRUCTURAL MEMBER (mm) | HEIGHT OF REINFORCING MATERIAL *2 (mm) | FLATTENING *3 | INNER HEIGHT OF REINFORCING MATERIAL (mm) | DEFLECTION OF STRUCTURAL MEMBER UNDER LOAD P1 *4 (mm) | DEFLECTION REDUCTION RATE FOR LOAD P1 *5 (%) | DEFLECTION OF STRUCTURAL MEMBER UNDER LOAD P2 *6 (mm) | DEFLECTION REDUCTION RATE FOR LOAD P2 *7 (%) | DEFLECTION OF STRUCTURAL MEMBER UNDER LOAD P2 *8 (mm) | DEFLECTION REDUCTION RATE FOR LOAD P2 *9 (%) | REMARK |
|---|---|---|---|---|---|---|---|---|---|---|---|---|---|---|
| 2 | ONE TRIANGULAR RIB | 79 | 75 | 80 | — | — | — | 0.361 | — | 0.450 | — | — | — | COMPARATIVE EXAMPLE |
| 12 | ONE TRIANGULAR RIB | 90 | 85 | 80 | — | — | — | 0.354 | — | 0.452 | — | — | — | COMPARATIVE EXAMPLE |
| 13 | ONE TRIANGULAR RIB | 130 | 115 | 80 | — | — | — | 0.330 | — | 0.430 | — | — | — | COMPARATIVE EXAMPLE |
| 16 | ONE TRIANGULAR RIB | 140 | 120 | 80 | — | — | — | 0.311 | — | 0.422 | — | — | — | COMPARATIVE EXAMPLE |
| 5 | ONE TRIANGULAR RIB | 171 | 140 | 80 | — | — | — | 0.267 | — | 0.415 | — | — | — | COMPARATIVE EXAMPLE |
| 17 | ONE TRIANGULAR RIB | 260 | 210 | 80 | — | — | — | 0.206 | — | 0.430 | — | — | — | COMPARATIVE EXAMPLE |
| 18 | ONE TRIANGULAR RIB | 280 | 230 | 80 | — | — | — | 0.198 | — | 0.332 | — | — | — | COMPARATIVE EXAMPLE |
| 501 | CLOSED CROSS-SECTION STRUCTURAL MEMBER | 79 | 75 | 80 | 89.2 | 0.89 | 84.6 | 0.355 | 1.6 | 0.435 | — | 3.3 | — | REFERENCE EXAMPLE |
| 502 | CLOSED CROSS-SECTION STRUCTURAL MEMBER | 90 | 85 | 80 | 89.2 | 1.01 | 84.6 | 0.345 | 2.6 | 0.432 | — | 4.4 | — | EXAMPLE OF PRESENT INVENTION |
| 503 | CLOSED CROSS-SECTION STRUCTURAL MEMBER | 130 | 100 | 80 | 89.2 | 1.46 | 84.6 | 0.321 | 2.7 | 0.410 | — | 4.7 | — | EXAMPLE OF PRESENT INVENTION |
| 504 | CLOSED CROSS-SECTION STRUCTURAL MEMBER | 140 | 120 | 80 | 89.2 | 1.57 | 84.6 | 0.297 | 4.4 | 0.400 | — | 5.2 | — | EXAMPLE OF PRESENT INVENTION |

F I G. 26 (cont.)

| NO. | REINFORCING MATERIAL | MAXIMUM WIDTH OF OPENING IN REINFORCING MATERIAL(mm) | LENGTH OF REINFORCING MATERIAL ALONG STRUCTURAL MEMBER(mm) | HEIGHT OF STRUCTURAL MEMBER (mm) | HEIGHT OF REINFORCING MATERIAL*2 (mm) | FLATTENING | INNER HEIGHT OF REINFORCING MATERIAL*3 (mm) | DEFLECTION OF STRUCTURAL MEMBER UNDER LOAD P1*4 (mm) | DEFLECTION REDUCTION RATE FOR LOAD P1 1*5 (%) | DEFLECTION REDUCTION RATE FOR LOAD P1 2*6 (%) | DEFLECTION OF STRUCTURAL MEMBER UNDER LOAD P2*7 (mm) | DEFLECTION REDUCTION RATE FOR LOAD P2 1*8 (%) | DEFLECTION REDUCTION RATE FOR LOAD P2 2*9 (%) | REMARK |
|---|---|---|---|---|---|---|---|---|---|---|---|---|---|---|
| 505 | CLOSED CROSS-SECTION STRUCTURAL MEMBER | 171 | 140 | 80 | 89.2 | 1.92 | 84.6 | 0.254 | 4.6 | — | 0.383 | 5.4 | — | EXAMPLE OF PRESENT INVENTION |
| 506 | CLOSED CROSS-SECTION STRUCTURAL MEMBER | 260 | 210 | 80 | 89.2 | 2.91 | 84.6 | 0.196 | 4.9 | — | 0.3321 | 5.5 | — | EXAMPLE OF PRESENT INVENTION |
| 507 | CLOSED CROSS-SECTION STRUCTURAL MEMBER | 280 | 230 | 80 | 89.2 | 3.14 | 84.6 | 0.191 | 3.7 | — | 0.316 | 4.9 | — | REFERENCE EXAMPLE |

F I G. 27

| NO. | REINFORCING MATERIAL | MAXIMUM WIDTH OF OPENING IN REINFORCING MATERIAL(mm) | LENGTH OF REINFORCING MATERIAL ALONG STRUCTURAL MEMBER(mm) | HEIGHT OF REINFORCING MATERIAL*2 (mm) | FLATTENING REINFORCING MATERIAL*3 (mm) | INNER HEIGHT OF REINFORCING MATERIAL*3 (mm) | DEFLECTION OF STRUCTURAL MEMBER UNDER LOAD P1 *4 (mm) | DEFLECTION REDUCTION RATE FOR LOAD P1 *5 (%) | DEFLECTION REDUCTION RATE FOR LOAD P1 *6 (%) | DEFLECTION OF STRUCTURAL MEMBER UNDER LOAD P2 *7 (mm) | DEFLECTION REDUCTION RATE FOR LOAD P2 *8 (%) | DEFLECTION REDUCTION RATE FOR LOAD P2 *9 (%) | REMARK |
|---|---|---|---|---|---|---|---|---|---|---|---|---|---|
| 19 | ONE L-SHAPED RIB | 79 | 65 | 80 | – | – | 0.469 | – | – | 0.588 | – | – | COMPARATIVE EXAMPLE |
| 20 | ONE L-SHAPED RIB | 85 | 70 | 80 | – | – | 0.460 | – | – | 0.578 | – | – | COMPARATIVE EXAMPLE |
| 21 | ONE L-SHAPED RIB | 115 | 100 | 80 | – | – | 0.429 | – | – | 0.546 | – | – | COMPARATIVE EXAMPLE |
| 22 | ONE L-SHAPED RIB | 120 | 105 | 80 | – | – | 0.413 | – | – | 0.541 | – | – | COMPARATIVE EXAMPLE |
| 23 | ONE L-SHAPED RIB | 171 | 150 | 80 | – | – | 0.347 | – | – | 0.527 | – | – | COMPARATIVE EXAMPLE |
| 24 | ONE L-SHAPED RIB | 240 | 190 | 80 | – | – | 0.289 | – | – | 0.467 | – | – | COMPARATIVE EXAMPLE |
| 25 | ONE L-SHAPED RIB | 250 | 200 | 80 | – | – | 0.273 | – | – | 0.451 | – | – | COMPARATIVE EXAMPLE |
| 26 | ONE L-SHAPED RIB | 380 | 310 | 80 | – | – | 0.268 | – | – | 0.422 | – | – | COMPARATIVE EXAMPLE |
| 27 | ONE L-SHAPED RIB | 470 | 380 | 80 | – | – | 0.250 | – | – | 0.405 | – | – | COMPARATIVE EXAMPLE |
| 28 | ONE L-SHAPED RIB | 490 | 410 | 80 | – | – | 0.241 | – | – | 0.384 | – | – | COMPARATIVE EXAMPLE |
| 29 | ONE L-SHAPED RIB | 550 | 450 | 80 | – | – | 0.229 | – | – | 0.363 | – | – | COMPARATIVE EXAMPLE |

F I G. 27 (cont.)

| NO. | REINFORCING MATERIAL | MAXIMUM WIDTH OF OPENING IN REINFORCING MATERIAL (mm) | LENGTH OF REINFORCING MATERIAL ALONG STRUCTURAL MEMBER (mm) | HEIGHT OF STRUCTURAL MEMBER (mm) | HEIGHT OF REINFORCING MATERIAL*2 (mm) | FLATTENING*1 | INNER HEIGHT OF REINFORCING MATERIAL*3 (mm) | DEFLECTION OF STRUCTURAL MEMBER UNDER LOAD P1*4 (mm) | DEFLECTION REDUCTION RATE FOR LOAD P1 1*5 (%) | DEFLECTION RATE FOR LOAD P1 2*6 (%) | DEFLECTION OF STRUCTURAL MEMBER UNDER LOAD P2*7 (mm) | DEFLECTION REDUCTION RATE FOR LOAD P2 1*8 (%) | DEFLECTION REDUCTION RATE FOR LOAD P2 2*9 (%) | REMARK |
|---|---|---|---|---|---|---|---|---|---|---|---|---|---|---|
| 601 | CLOSED CROSS-SECTION STRUCTURAL MEMBER | 79 | 65 | 80 | 80.0 | 0.99 | 75.4 | 0.439 | 6.5 | – | 0.535 | 9.0 | – | REFERENCE EXAMPLE |
| 602 | CLOSED CROSS-SECTION STRUCTURAL MEMBER | 85 | 70 | 80 | 80.0 | 1.06 | 75.4 | 0.419 | 8.9 | – | 0.512 | 11.5 | – | EXAMPLE OF PRESENT INVENTION |
| 603 | CLOSED CROSS-SECTION STRUCTURAL MEMBER | 115 | 100 | 80 | 80.0 | 1.44 | 75.4 | 0.388 | 9.6 | – | 0.477 | 12.7 | – | EXAMPLE OF PRESENT INVENTION |
| 604 | CLOSED CROSS-SECTION STRUCTURAL MEMBER | 120 | 105 | 80 | 80.0 | 1.50 | 75.4 | 0.351 | 15.1 | – | 0.452 | 16.4 | – | EXAMPLE OF PRESENT INVENTION |
| 605 | CLOSED CROSS-SECTION STRUCTURAL MEMBER | 171 | 150 | 80 | 80.0 | 2.14 | 75.4 | 0.289 | 16.8 | – | 0.431 | 18.2 | – | EXAMPLE OF PRESENT INVENTION |
| 606 | CLOSED CROSS-SECTION STRUCTURAL MEMBER | 240 | 190 | 80 | 80.0 | 3.00 | 75.4 | 0.240 | 17.0 | – | 0.375 | 19.8 | – | EXAMPLE OF PRESENT INVENTION |
| 607 | CLOSED CROSS-SECTION STRUCTURAL MEMBER | 250 | 200 | 80 | 80.0 | 3.13 | 75.4 | 0.238 | 17.7 | – | 0.374 | 20.0 | – | EXAMPLE OF PRESENT INVENTION |
| 608 | CLOSED CROSS-SECTION STRUCTURAL MEMBER | 380 | 310 | 80 | 80.0 | 4.75 | 75.4 | 0.354 | 14.4 | – | 0.445 | 17.7 | – | EXAMPLE OF PRESENT INVENTION |
| 609 | CLOSED CROSS-SECTION STRUCTURAL MEMBER | 470 | 380 | 80 | 80.0 | 5.88 | 75.4 | 0.299 | 13.9 | – | 0.443 | 15.9 | – | EXAMPLE OF PRESENT INVENTION |
| 610 | CLOSED CROSS-SECTION STRUCTURAL MEMBER | 490 | 410 | 80 | 80.0 | 6.13 | 75.4 | 0.257 | 11.2 | – | 0.406 | 13.0 | – | REFERENCE EXAMPLE |
| 611 | CLOSED CROSS-SECTION STRUCTURAL MEMBER | 550 | 450 | 80 | 80.0 | 6.88 | 75.4 | 0.247 | 9.7 | – | 0.400 | 11.2 | – | REFERENCE EXAMPLE |

STRUCTURE INCLUDING A FRAME HAVING FOUR SIDES AND A CLOSED CROSS-SECTION STRUCTURAL MEMBER

This application is a divisional application of U.S. application Ser. No. 13/510,673, filed May 18, 2012, which is a national stage application of International Application No. PCT/JP2010/071324 filed Nov. 30, 2010, which claims priority to Japanese Patent Application Nos. 2010-187241, filed Aug. 24, 2010, and 2009-274920, filed Dec. 2, 2009, each of which is incorporated herein by reference.

TECHNICAL FIELD

The present invention relates to a structure including a structural member configured like a frame with four sides, the structural member including a closed cross-section structural member at a crossing portion thereof, thus reducing deflection.

BACKGROUND ART

For reduced weights or increased sizes, steel structures such as automobiles, construction machines, bridges, and architectural buildings need to use high tensile strength steel called a high tensile strength material to reduce the board thicknesses or cross-sectional areas of members thereof. However, disadvantageously, the reduced board thicknesses or cross-sectional areas of the members may reduce the rigidity thereof, causing the members to be significantly deformed, that is, deflected, under an external force. This may prevent the safety of steel structures from being ensured. Thus, there has been a strong demand for a technique to achieve a consistent reduction in both the weight and deflection of structural members.

Among techniques to reduce the deflection of structural members, a technique is widely known in which a reinforcing plate called a rib is attached to a crossing portion of the structural member. Furthermore, Patent Literature 1 discloses a technique to bend an end of a plate-like reinforcing plate into a U or V shape to improve the proof stress and fatigue performance of the structural member. Additionally, Patent Literature 2 discloses a technique to define the angle between a U- or V-shaped reinforcing material and a structural member and the width of the combination of the reinforcing material and structural member, to improve the proof stress and fatigue performance of the structural member.

Furthermore, Patent Literature 3 discloses a coupled structure including a structural member having a hollow cross section with bulkheads and a coupling member with an opening end into which the structural member is inserted.

Additionally, Patent Literature 4 discloses a joining structure in which a columnar structural member is joined to a second structural member. A plate-like reinforcing material is welded to the columnar structural member and second structural member joined together to reinforce the junction between the structural members. The reinforcing material includes a bent portion that is U- or V-shaped along a surface of the structural member, and a ring-like opening.

CITATION LIST

Patent Literature

Patent Literature 1: Japanese Laid-Open Patent Publication No. 2001-132102

Patent Literature 2: Japanese Laid-Open Patent Publication No. 2006-2464

Patent Literature 3: Japanese Laid-Open Patent Publication No. 9-118257

Patent Literature 4: Japanese Laid-Open Patent Publication No. 2005-54565

SUMMARY OF INVENTION

Technical Problem

Those of the above-disclosed techniques in which an unbent plate-like reinforcing plate is arranged at a crossing portion of the structural member are effective for reducing a deflection occurring when the structural member acts to deflect in an in-plane direction, that is, the deflection occurring in a direction in which the angle of the crossing portion of the structural member decreases. However, disadvantageously, if the structural member acts to deflect in an out-of-plane direction, that is, if the structural member deflects in a direction perpendicular to the reinforcing plate, the techniques are less effective for reducing the deflection.

Furthermore, in Patent Literature 1, the reinforcing plate is bent into a U or V shape to allow improvement of the proof stress and fatigue performance of the portion of the structural member with the reinforcing plate attached thereto, while effectively reducing the deflection occurring if the structural members act to deflect in the in-plane direction. However, this technique is disadvantageously less effective for reducing the deflection occurring if the structural member acts to deflect in the out-of-plane direction.

Additionally, the technique in Patent Literature 2 defines the angle between a tubular structural member and a U- or V-shaped reinforcing material secured between the tubular structural member and a base plate as well as the width of the combination of the structural member and the reinforcing material. This allows improvement of the proof stress and fatigue performance of the portion of the structural member with the reinforcing plate attached thereto, while effectively reducing the deflection occurring if the structural member acts to deflect in the in-plane direction. However, this technique is disadvantageously less effective for reducing the deflection occurring if the structural member acts to deflect in the out-of-plane direction.

In addition, the technique in Patent Literature 3 provides bulkheads in a structural member of a car body to divide the structural member into a plurality of compartments so that the structural member has a hollow cross section, and forms opening ends in coupling members corresponding to the plurality of compartments, thus improving the rigidity and strength of the coupled structure. However, the technique is disadvantageously less effective for reducing the deflection occurring if the structural member acts to deflect in the in-plane and out-of-plane directions.

In addition, the technique in Patent Literature 4 is applied to a joined structure in which a columnar structural member is joined to a second structural member. However, although Patent Literature 4 specifies a preferable dimensional relationship between the columnar structural member, which is a circular steel stand column, and a reinforcing material, the dimensional relationship cannot be applied to joining of the reinforcing material to a member of a different shape. Furthermore, in Patent Literature 4, the reinforcing material is joined to an outer-peripheral circular-arc surface of the columnar structural member. Thus, the thickness of the reinforcing material and the like are limited, and an effective dimensional relationship and the like may not be always established.

An object of the present invention is to provide a structure including a structural member configured like a frame with four sides, the structure effectively reducing the deflection of the structural member subjected to loads acting in the in-plane and out-of-plane direction.

Solution to Problem

The present invention provides a structure including a structural member configured like a frame with four sides, characterized in that a closed cross-section structural member is provided in a corner formed by crossing between each of opposite ends of a predetermined side subjected to a load and a second side so as to extend along an inner-peripheral flat surface of the predetermined side and an inner-peripheral flat surface of the second side, the closed cross-section structural member includes two horizontal portions separated from each other in a thickness direction of the structural member and extending in an in-plane direction of the frame-like structural member, a vertical portion connecting first ends of the two horizontal portions together, and a vertical portion connecting second ends of the two horizontal portions together, the closed cross-section structural member includes a first opening formed therein facing the inner-peripheral flat surface of the frame-like structural member and a second opening formed therein facing inside of the frame-like structural member, a part of an opening edge of the first opening corresponding at least to the two vertical portions is joined to the inner-peripheral flat surface of the frame-like structural member, and a flattening that is a ratio of a maximum width of the second opening to a height of the closed cross-section structural member is greater than 1.0 and not greater than 3.0.

The structure according to the present invention is further characterized in that the flattening is at least 1.5.

The structure according to the present invention is further characterized in that the opening edge of the first opening is entirely joined to the inner-peripheral flat surface of the frame-like structural member.

The structure according to the present invention is further characterized in that a height of the closed cross-section structural member is identical to a thickness of the frame-like structural member.

The structure according to the present invention is further characterized in that an inner height of the closed cross-section structural member is identical to a thickness of the frame-like structural member.

The structure according to the present invention is further characterized in that the closed cross-section structural member is provided in all of four corners of the frame-like structural member.

The structure according to the present invention is further characterized in that the horizontal portions of the closed cross-section structural member are smoothly connected to the vertical portions of the closed cross-section structural member.

The present invention provides another structure including a structural member configured like a frame with four sides, characterized in that a closed cross-section structural member is provided in a corner formed by crossing between each of opposite ends of a predetermined side subjected to a load and a second side so as to extend along an outer-peripheral flat surface of the predetermined side and an outer-peripheral flat surface of the second side, the closed cross-section structural member includes two horizontal portions separated from each other in a thickness direction of the structural member and extending in an in-plane direction of the frame-like structural member, a vertical portion connecting first ends of the two horizontal portions together, and a vertical portion connecting second ends of the two horizontal portions together, the closed cross-section structural member includes a first opening formed therein facing the outer-peripheral flat surface of the frame-like structural member and a second opening formed therein facing outside of the frame-like structural member, a part of an opening edge of the first opening corresponding at least to the two vertical portions is joined to the outer-peripheral flat surface of the frame-like structural member, and a flattening that is a ratio of a maximum width of the second opening to a height of the closed cross-section structural member is greater than 1.0 and not greater than 6.0.

The present invention provides another structure including a structural member configured like a frame with four sides, characterized in that a closed cross-section structural member is provided in a corner formed by crossing between each of opposite ends of a predetermined side subjected to a load and a second side so as to extend along an inner-peripheral flat surface of the predetermined side and an inner-peripheral flat surface of the second side, the closed cross-section structural member includes a horizontal portion extending in an in-plane direction of the frame-like structural member at a predetermined height position in a thickness direction of the structural member, two vertical portions connected to each ends of the horizontal portion, and a connection portion connecting the two vertical portions together, the closed cross-section structural member includes a first opening formed therein facing the inner-peripheral flat surface of the frame-like structural member and a second opening formed therein facing inside of the frame-like structural member, a part of an opening edge of the first opening corresponding at least to the two vertical portions is joined to the inner-peripheral flat surface of the frame-like structural member, and a flattening that is a ratio of a maximum width of the second opening to a height of the closed cross-section structural member is greater than 1.0 and not greater than 3.0.

The present invention provides another structure including a structural member configured like a frame with four sides, characterized in that a closed cross-section structural member is provided in a corner formed by crossing between each of opposite ends of a predetermined side subjected to a load and a second side so as to extend along an outer-peripheral flat surface of the predetermined side and an outer-peripheral flat surface of the second side, the closed cross-section structural member includes a horizontal portion extending in an in-plane direction of the frame-like structural member at a predetermined height position in a thickness direction of the structural member, two vertical portions connected to each ends of the horizontal portion, and a connection portion connecting the two vertical portions together, the closed cross-section structural member includes a first opening formed therein facing the outer-peripheral flat surface of the frame-like structural member and a second opening formed therein facing outside of the frame-like structural member, a part of an opening edge of the first opening corresponding at least to the two vertical portions is joined to the outer-peripheral flat surface of the frame-like structural member, and a flattening that is a ratio of a maximum width of the second opening to a height of the closed cross-section structural member is greater than 1.0 and not greater than 6.0.

Advantageous Effects of Invention

According to the present invention, in the structure including the structural member configured like a frame with four sides, the deflection of the structural member subjected to loads acting in the in-plane and out-of-plane direction can be effectively reduced. The present invention thus has a great industrial significance.

BRIEF DESCRIPTION OF DRAWINGS

FIG. 3 is a diagram showing the relationship between another load input to a structural member and another deflection.

FIG. 4 is a perspective view showing the structure according to the first embodiment in which a closed cross-section structural member is arranged in a crossing corner of the frame-like structural member.

FIG. 5A is a plan view of the closed cross-section structural member in the structure according to the first embodiment.

FIG. 5B is a side view of the closed cross-section structural member in the structure according to the first embodiment.

FIG. 6 is a perspective view showing a comparative example in which a non-flattened closed cross-section structural member arranged in a crossing corner of the frame-like structural member.

FIG. 7 is a perspective view showing a variation of the first embodiment in which another closed cross-section structural member is arranged in a crossing corner of the frame-like structural member.

FIG. 10 is a perspective view showing a structure according to a fourth embodiment in which a closed cross-section structural member is arranged in a crossing corner of a frame-like structural member.

FIG. 11 is a perspective view showing a structure according to a fifth embodiment in which a closed cross-section structural member is arranged in a crossing corner of a frame-like structural member.

FIG. 22 is a diagram showing results for the examples.
FIG. 23 is a diagram showing results for the examples.
FIG. 24 is a diagram showing results for the examples.
FIG. 25 is a diagram showing results for the examples.
FIG. 26 is a diagram showing results for the examples.
FIG. 27 is a diagram showing results for the examples.

DESCRIPTION OF EMBODIMENTS

Figure 1:
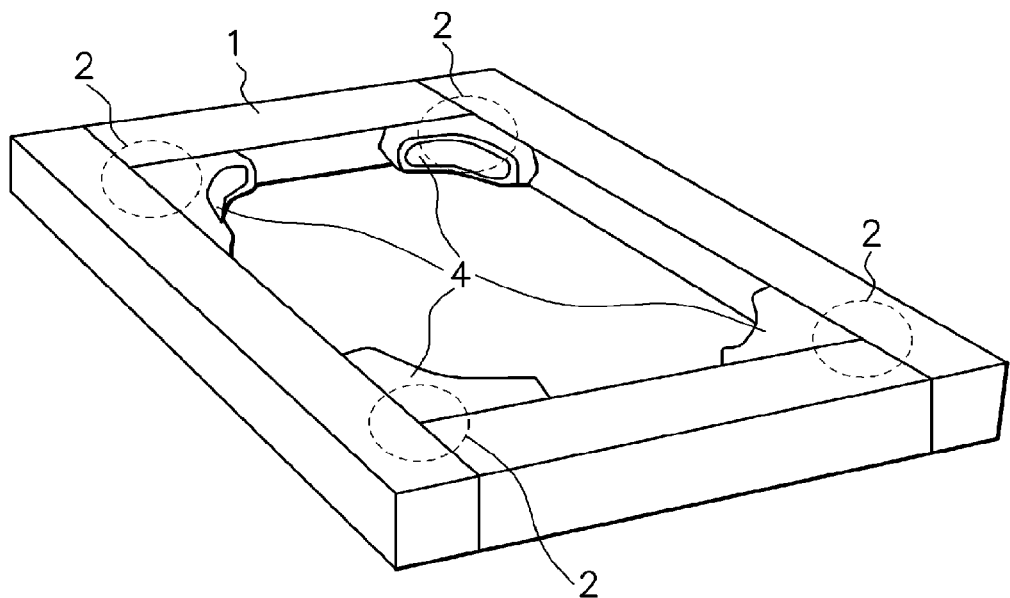
FIG. 1 is a perspective view showing a structure according to a first embodiment.

With reference to the drawings, preferred embodiments of the present invention will be described in detail. In the specification and drawings, components with substantially the same functional configurations are denoted by the same reference numerals. Duplicate descriptions of these components are omitted.

First Embodiment

Figure 2:
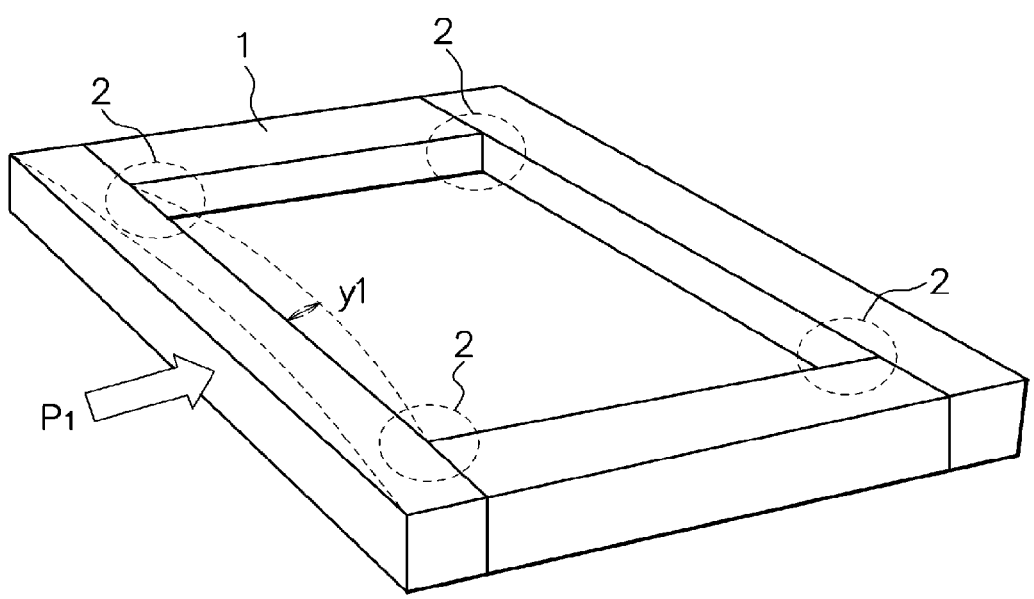
FIG. 2 is a diagram showing the relationship between a load input to a structural member and a deflection.

First, FIG. 2 and FIG. 3 show a structure to which the present invention is applicable. The structure includes a structural member 1 configured like a frame (quadrilateral shape) with four sides by joining four hollow rectangular bars with a rectangular cross section together into a quadrilateral shape. A member different from the structural member 1 may be joined to the structure, though this is not shown in the drawings. Such a structure is widely applied to common structures, for example, an engine cradle on which an engine of a car is installed and a rear sub-frame provided in the rear of the car.

The present inventors examined in detail a deflection y1 of the structural member 1 which occurs when a load $P_1$ is input inward to one side of the structural member 1, that is, when an in-plane-wise load is input to the structural member 1. Furthermore, as shown in FIG. 3, the present inventors examined in detail a deflection y2 of the structural member 1 which occurs when a load $P_2$ is input downward to one side of the structural member 1, that is, when an out-of-plane-wise load is input to the structural member 1.

Figure 20:
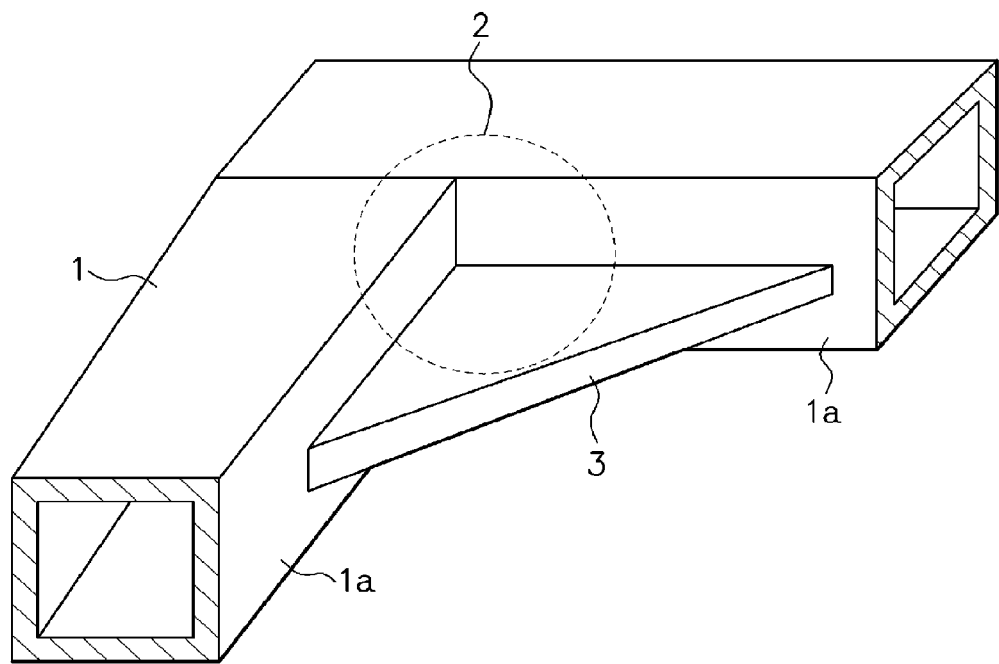
FIG. 20 is a diagram showing an example in which a triangular rib is arranged in a crossing corner of a frame-like structural member according to a conventional technique.
Figure 21:
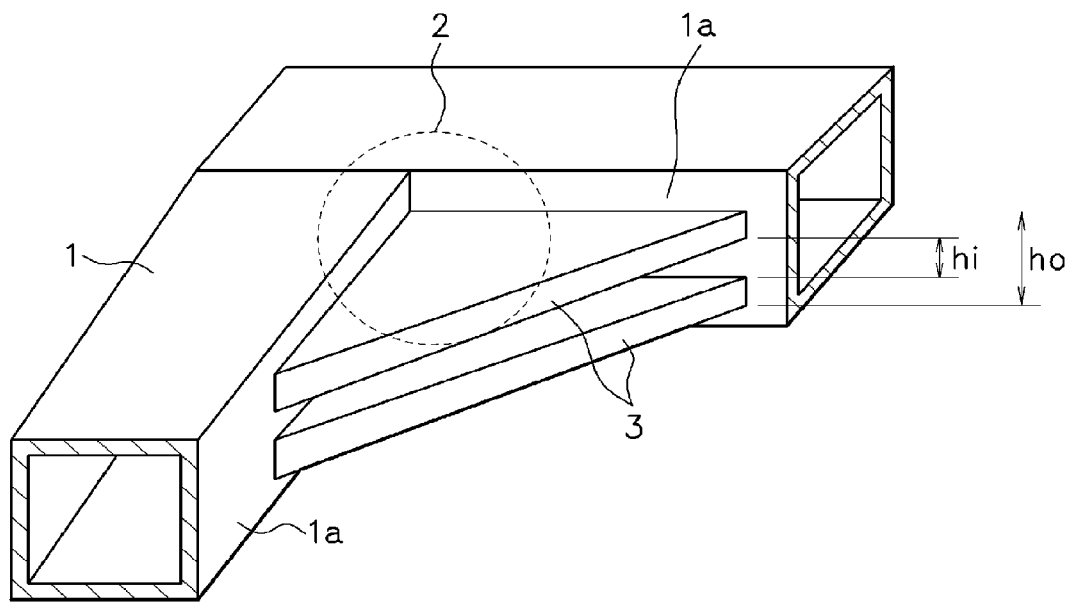
FIG. 21 is a diagram showing an example in which two triangular ribs are arranged in the crossing corner of the frame-like structural member according to the conventional technique.

As a result, the present inventors have found out the following. The structural member 1 is deformed significantly near the center thereof. Thus, the deflection y1 of the structural member 1 which occurs when the load $P_1$ is input inward to the structural member 1 depends on a second moment of area generated near the center of the structural member 1. However, the structural member 1 is also deformed significantly in a crossing corner 2 of the structural member 1. Hence, reinforcement is effective for reducing the deformation of the corner 2. In this case, the deflection y1 is not substantially reduced simply by joining a triangular rib 3 as a reinforcing plate to the crossing corner 2 of the structural member 1 as shown in FIG. 20 and FIG. 21. Moreover, if the load $P_2$ is input downward to the structural member 1, the structural member 1 is not sufficiently prevented from being subjected to lateral buckling or deformation of the cross-sectional shape. Thus, the present inventors examined various manners of reinforcement which reduce both the deflections y1 and y2.

The present inventors have found out that a closed cross-section structural member 4 serving as a reinforcing material can be very effectively provided at a corner 2 of the structural member 1, formed by crossing between each of the opposite ends of a predetermined side subjected to a load and a second side, as shown in FIG. 1 and FIG. 4. The closed cross-section structural member 4 is provided so as to extend along an inner-peripheral flat surface 1a of the predetermined side of the structural member 1 and an inner-peripheral flat surface 1a of the second side.

As shown in FIG. 5A and FIG. 5B, the closed cross-section structural member 4 includes two plate-like horizontal portions 5 arranged opposite each other and two plate-like vertical portions 6 arranged opposite each other. Each of the horizontal portions 5 is continuous with the corresponding vertical portion 6 to form the closed cross section. That is, the closed cross-section structural member 4 includes the two horizontal portions 5 separated from each other in the thickness direction of the structural member 1 and extending in the plane direction of the structural member 1 and the two vertical portions 6 connecting first ends of the two horizontal portions 5 together and second ends of the two horizontal portions 5 together, respectively. The closed cross-section structural member includes a first opening 7 formed therein facing an inner-peripheral flat surface 1a of the structural member 1 and a second opening 8 formed therein facing the inside of the structural member 1. The first opening 7 has an annular shape formed by connecting open ends of generally U-shaped openings together at right angles. The opening edge of the first opening 7 is welded and joined to the inner-peripheral flat surface 1a of the structural member 1. In this case, the opening edge of the first opening 7 may be arc-welded to the inner-peripheral flat surface 1a from the outer-peripheral side of the opening edge, from the inner-peripheral side of the opening edge, or from both the outer and inner-peripheral sides.

Although the horizontal portion 5 extends in the plane direction of the structural member 1, the horizontal portion 5 need not be an entirely flat plane. The horizontal portion 5 may at least partly extend in the plane direction of the structural member 1. Furthermore, the vertical portion 6 need not be an entirely flat plane. The horizontal portion 5 and vertical portion 6 formed into curved planes can be smoothly connected together. Compared to a case where a flat horizontal portion 5 and a flat vertical portion 6 are connected together, this configuration prevents stress from being concentrated in corners, and thus has a sufficient strength to resist fatigue fracture.

When the closed cross-section structural member 4 is used as a reinforcing material, if the in-plane-wise load $P_1$ is input to the structural member 1, the two horizontal portions 5 offer increased resistance to in-plane-wise deformation of the structural member 1. This is effective for reducing the deflection y1. Furthermore, if the out-of-plane-wise load $P_2$ is input to the structural member 1, the two horizontal portions 5 similarly offer increased resistance to out-of-plane-wise deformation of the structural member 1, whereas the vertical portions 6 effectively prevents the structural member 1 from being subjected to lateral buckling or deformation of the cross-sectional shape. This is effective for reducing the deflection y2. As described above, evidently, the structure with the closed cross-section structural member 4 provided in each crossing corner 2 of the structural member 1 serves to significantly reduce the deflection of the structural member 1.

If the side of the structural member 1 on which the load mainly acts (side on which deflection may occur) is known, the closed cross-section structural member 4 is preferably provided in the corners 2 located at the respective opposite ends of this side. However, if the load may act on all of the four sides, the deflection of the structural member 1 can be reduced in a well-balanced manner by providing the closed cross-section structural member 4 in each of the four corners (four corners 2) of the structural member 1 as shown in FIG. 1.

Figure 13:
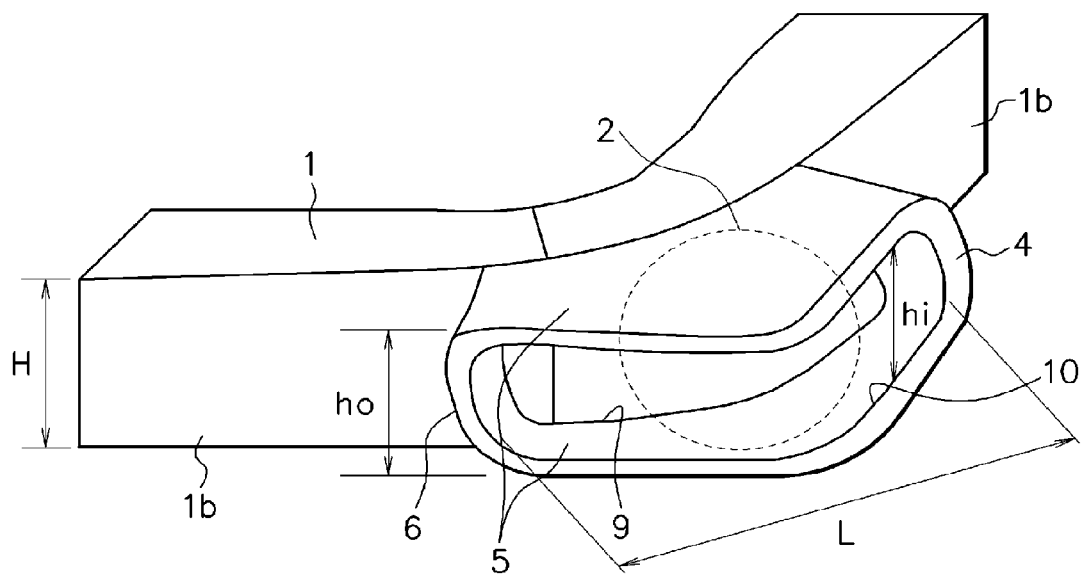
FIG. 13 is a perspective view showing a variation of the sixth embodiment in which another closed cross-section structural member is arranged in a crossing corner of the frame-like structural member.
Figure 14A:
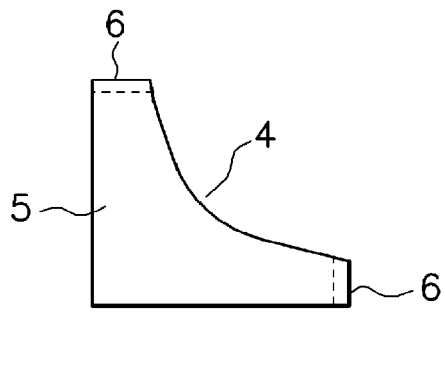
FIG. 14A is a plan view showing a variation of the closed cross-section structural member.
Figure 14B:
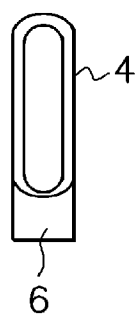
FIG. 14B is a side view showing a variation of the closed cross-section structural member.
Figure 15A:
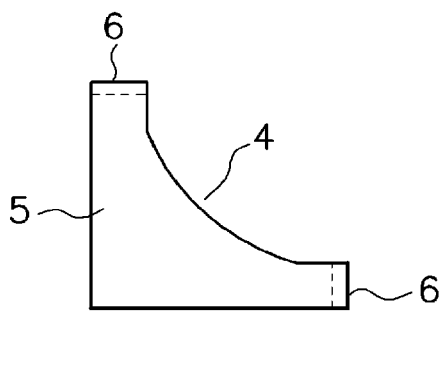
FIG. 15A is a plan view showing a variation of the closed cross-section structural member.
Figure 15B:
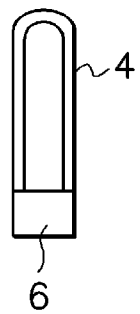
FIG. 15B is a side view showing a variation of the closed cross-section structural member.
Figure 16A:
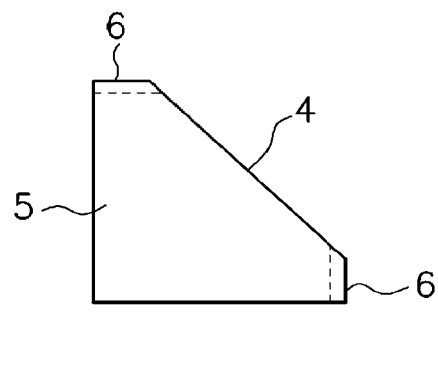
FIG. 16A is a plan view showing a variation of the closed cross-section structural member.
Figure 16B:
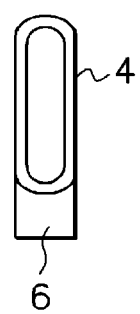
FIG. 16B is a side view showing a variation of the closed cross-section structural member.

The structure according to the present invention includes the structural member 1 configured like a frame with four sides. The side portions of the structural member 1 may be shaped like straight lines or curves with a certain curvature. The four sides of the structural member 1 cross one another to form the corners 2, and may cross one another at acute, obtuse, or right angles or so as to have a certain curvature as shown in FIG. 13.

In the present invention, it is assumed that the in-plane-wise load $P_1$ or the out-of-plane-wise load $P_2$ is input to the structural member 1. Thus, the present invention is different from a structure to which only one of the in-plane-wise load $P_1$ and the out-of-plane-wise load $P_2$ is input. The present invention accomplishes the object specific to the structure to which the both loads $P_1$ and $P_2$ are input. The present invention has been found based on knowledge that cannot be obtained from the structure to which only one of the loads is input.

The present inventors further examined in detail the effects of the shape of the closed cross-section structural member 4 on the deflections y1 and y2 of the structural member 1. As a result, the present inventors have found out that the closed cross-section structural member 4 flattened along the structural member 1 as shown in FIG. 4 is effective for reducing both the deflections y1 and y2. The flattening as used herein refers to a flattening of greater than 1.0; the flattening is defined to be the ratio of the maximum width L of the second opening 8 to the height $h_0$ of the closed cross-section structural member 4 as shown in FIG. 4, FIG. 5A, and FIG. 5B. Here, the height $h_0$ of the closed cross-section structural member 4 refers to the dimension of the structural member 1 in the thickness direction thereof, that is, the dimension between the top surface of the upper horizontal portion 5 and the bottom surface of the lower horizontal portion 5.

The horizontal portion 5 of the closed cross-section structural member 4 significantly impacts both the case where the in-plane-wise load $P_1$ is input to the structural member 1 and the case where the out-of-plane-wise load $P_2$ is input to the structural member 1. That is, deformation resistance to the in-plane-wise load and the out-of-plane-wise load increases consistently with the length of the horizontal portion 5 resulting from the flattening of the closed cross-section structural member 4 along the structural member 1. In addition, the presence of the vertical portions 6 of the closed cross-section structural member 4 significantly resists lateral buckling of the structural member 1 and deformation of the cross-sectional shape thereof. This enables a reduction on the deflections y1 and y2 of the structural member 1.

If the closed cross-section structural member 4 is not flattened along the structural member 1 as shown in FIG. 6, the horizontal portions 5 of the closed cross-section structural member 4 are shorter. Thus, this structural member 1 fails to offer sufficient deformation resistance to the in-plane-wise load and the out-of-plane-wise load. This prevents the deflections y1 and y2 of the structural member 1 from being effectively reduced.

Furthermore, as shown in FIG. 7, the closed cross-section structural member 4 may be flattened on one side of the corner of the structural member 1 in a biased manner. If the closed cross-section structural member 4 is flattened substantially evenly on both sides of the corner 2 of the structural member 1 as shown in FIG. 4, the deflections y1 and y2 are reduced on both the corresponding sides of the structural member 1. In contrast, it has been found that if the closed cross-section structural member 4 is flattened on one side of the corner 2 of the structural member 1 in a biased manner as shown in FIG. 7, the deflections y1 and y2 are reduced on the side of the structural member 1 on which the closed cross-section structural member 4 is flattened in a biased manner.

The range of the flattening effectively reducing the deflections y1 and y2 of the structural member 1 is preferably a flattening of at least 1.5 and not greater than 3.0. This is because a low degree of flattening (flattening of smaller than 1.5) is less effective for reducing deflection. In contrast, extreme flattening (flattening of greater than 3.0) is likely to subject the structural member 1 to lateral buckling or significant cross-sectional deformation. As described above, evidently, in the structure in which the closed cross-section structural member 4 is flattened along the structural member 1, the deflection of the structural member 1 is significantly reduced.

Second Embodiment

In a structure according to a second embodiment, the height $h_0$ of the closed cross-section structural member 4 is smaller than the thickness H of the structural member 1.

The present inventors examined in detail the effects of the height $h_0$ of the closed cross-section structural member 4 on the deflection of the structural member 1. As a result, it has been found out that if the thickness of the structural member 1 (height of the structural member 1 in the thickness direction thereof) is denoted by H, then in the structure including the closed cross-section structural member 4 with a height $h_0$ that is the same as the thickness H, the deflections y1 and y2 of the structural member 1 are significantly reduced. The height $h_0$ of the closed cross-section structural member 4 significantly impacts the deformation resistance of the structural member 1. When the height $h_0$ of the closed cross-section structural member 4 is substantially the same as the thickness H of the structural member 1 as shown in FIG. 4, the deflections y1 and y2 of the structural member 1 are effectively reduced in both the case where the in-plane-wise load is input to the structural member 1 and the case where the out-of-plane-wise load is input to the structural member 1.

Figure 8:
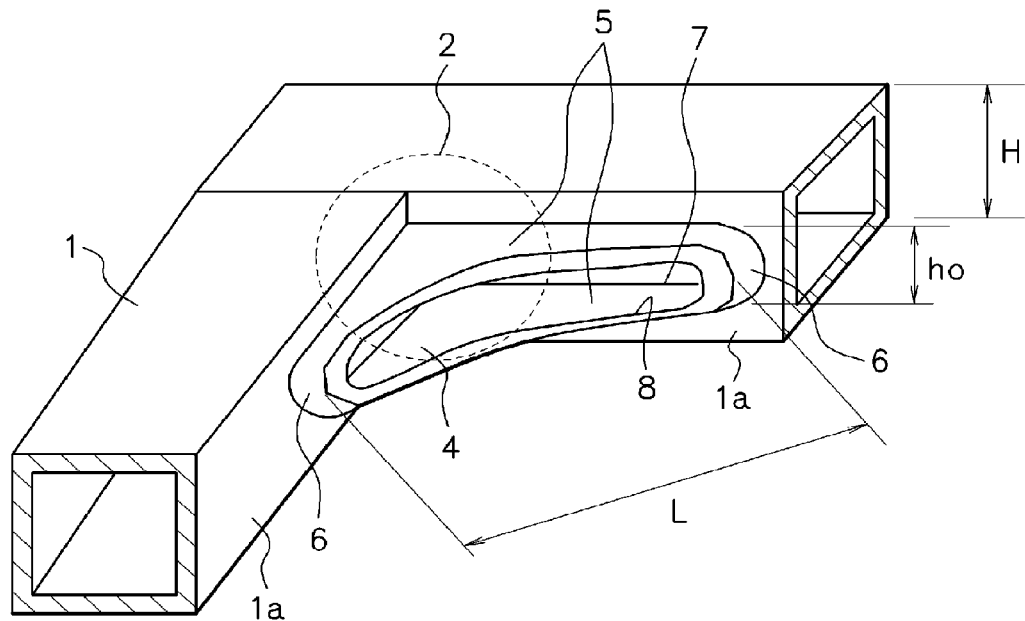
FIG. 8 is a perspective view showing a structure according to a second embodiment in which a closed cross-section structural member is arranged in a crossing corner of a frame-like structural member.

If the height $h_0$ of the closed cross-section structural member 4 is smaller than the thickness H of the structural member 1 as shown in FIG. 8, reduced deformation resistance is offered if the out-of-plane-wise load is input to the structural member 1. The structural member 1 also offers reduced resistance to lateral buckling and cross-sectional deformation. However, the second embodiment is also included in the scope of the present invention.

Third Embodiment

Figure 9:
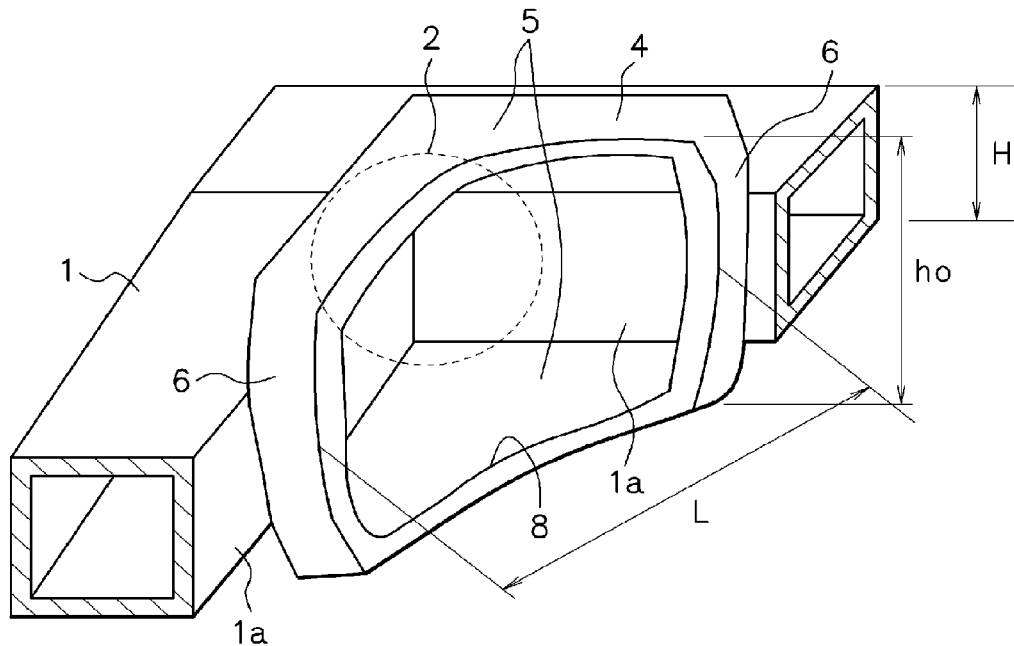
FIG. 9 is a perspective view showing a structure according to a third embodiment in which a closed cross-section structural member is arranged in a crossing corner of a frame-like structural member.

The upper limit of the height $h_0$ of the closed cross-section structural member 4 is not particularly limited. In a structure according to a third embodiment, the height $h_0$ of the closed cross-section structural member 4 is larger than the thickness H of the structural member 1 as shown in FIG. 9.

When the height $h_0$ of the closed cross-section structural member 4 is larger than the thickness H of the structural member 1, the junction between the closed cross-section structural member 4 and the structural member 1 is limited to the inside of the structural member 1 and is thus smaller. That is, the junction with the structural member 1 is a part of the opening edge of the first opening 7 which corresponds to the two vertical portions 6. Thus, the third embodiment is less effective for reducing the deflections y1 an y2 of the structural member 1 than the first and second embodiments in which the opening edge of the first opening 7 is entirely joined to the structural member 1, but is also included in the scope of the present invention.

Fourth Embodiment

The present inventors further examined the effects of the inner height $h_i$ of the closed cross-section structural member 4 on the deflection of the structural member 1. As a result, it has been found out that if the inner height $h_i$ of the closed cross-section structural member 4 is the same as the thickness H of the structural member 1, the deflection of the structural member 1 is significantly reduced. The inner height $h_i$ of the closed cross-section structural member 4 as used herein is defined as the height $h_0$ of the closed cross-section structural member 4 minus the upper and lower board thicknesses of the closed cross-section structural member 4 (board thicknesses of the horizontal portions 5).

As described above, the height $h_0$ of the closed cross-section structural member 4 significantly impacts the deflections y1 and y2 of the structural member 1. When the height $h_0$ of the closed cross-section structural member 4 is substantially the same as the thickness H of the structural member 1, the deflection of the structural member 1 is significantly reduced. However, the following has been found out. Even if the inner height $h_i$ of the closed cross-section structural member 4 is the same as the thickness H of the structural member 1 as shown in FIG. 10, when the horizontal portions 5 of the closed cross-section structural member 4 are fillet-welded onto the top and bottom surfaces, respectively, of the structural member 1, a sufficient junction strength is ensured, allowing a significant reduction in the deflections y1 and y2 of the structural member 1.

In this case, the height $h_0$ of the closed cross-section structural member 4 is larger than the thickness H of the structural member 1 by the upper and lower board thicknesses. However, the length of the junction between the closed cross-section structural member 4 and the structural member 1 remains almost unchanged compared to the case where the height $h_0$ of the closed cross-section structural member 4 is the same as the thickness H of the structural member 1. Thus, the deflections y1 and y2 of the structural member 1 can be significantly reduced as described above. Furthermore, in the embodiment shown in FIG. 4, the junction between the closed cross-section structural member 4 and the structural member 1 may require groove welding. However, the embodiment shown in FIG. 10 involves fillet welding instead of groove welding. This eliminates the need for time and effort for groove welding, resulting in improved processability.

The upper limit of the inner height $h_i$ of the closed cross-section structural member 4 is not particularly limited. However, when the inner height $h_i$ of the closed cross-section structural member 4 is larger than the thickness H of the structural member 1, the length of the junction between the closed cross-section structural member 4 and the structural member 1 is limited to the inside of the structural member 1 and thus reduced. This in turn decreases the rate of the reduction in the deflections y1 and y2 of the structural member 1. Thus, the inner height $h_i$ of the closed cross-section structural member 4 is preferably set such that the closed cross-section structural member 4 is joined to the structural member 1 all over the closed cross section thereof. As described above, evidently, the deflection of the structural member 1 is significantly reduced in the structure in which the inner height $h_i$ of the closed cross-section structural member 4 is the same as the thickness H of the structural member 1.

Fifth Embodiment

The first to fourth embodiments disclose the examples of the closed cross-section structural member 4 centered on the center of the thickness H of the structural member 1 and having a vertically symmetric shape as shown in FIG. 4 and FIG. 6 to FIG. 10. However, the present invention is not limited to these configurations. In a fifth embodiment, as shown in FIG. 11, the closed cross-section structural member 4 includes a horizontal portion 5 extending in the plane direction of the structural member 1 at a predetermined height position in the thickness direction of the structural member 1, two vertical portions 6 connected to ends of the horizontal portion, and a connection portion 11 connecting the two vertical portions 6 together. The closed cross-section structural member 4 includes a first opening 7 formed therein facing the inner-peripheral flat surface of the structural member 1 and a second opening 8 formed therein facing the inside of the structural member 1. The horizontal portion 5 is joined to the inner-peripheral flat surface of the structural member 1. The connection portion 11 is jointed to the top surface (or the bottom surface) of the structural member 1. Even this structure enables a reduction in the deflection of the structural member 1.

Sixth Embodiment

Figure 12:
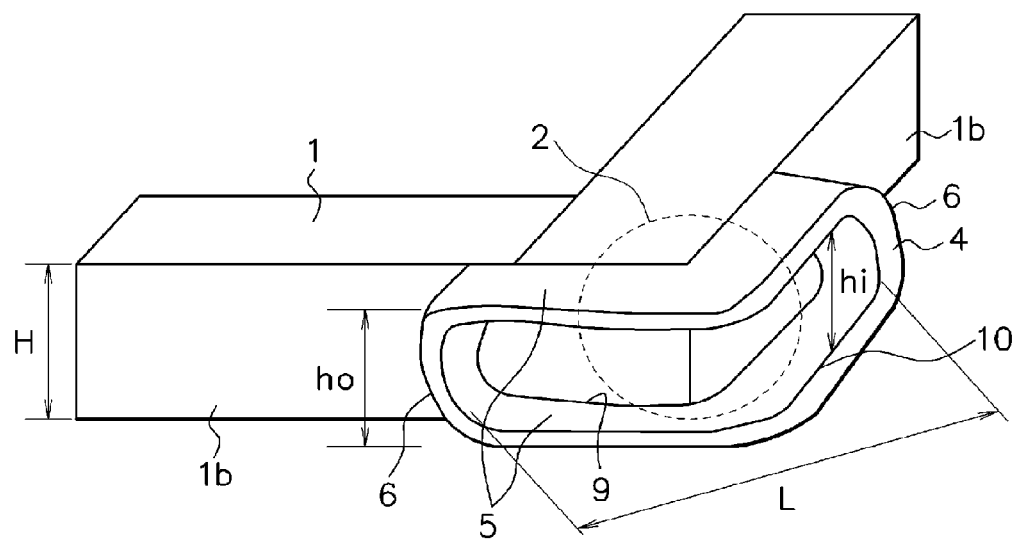
FIG. 12 is a perspective view showing a structure according to a sixth embodiment in which a closed cross-section structural member is arranged in a crossing corner of a frame-like structural member.

Moreover, the installation position of the closed cross-section structural member 4 of the structure of the present invention is not limited to the inside of the crossing portion of the structural member 1. The deflection of the structural member 1 is effectively reduced even if the closed cross-section structural member 4 is installed outside the crossing portion as shown in FIG. 12. That is, the closed cross-section structural member 4 includes two horizontal portions 5 separated from each other in the thickness direction of the structural member 1 and extending in the plane direction of the structural member 1, and two vertical portions 6 connecting first ends of the two horizontal portions 5 together and second ends of the two horizontal portions 5 together, respectively. The closed cross-section structural member 4 includes a first opening 9 formed therein facing the outer-peripheral flat surface 1b of the structural member 1 and a second opening 10 formed therein facing the outside of the structural member 1. In particular, if the crossing portion of the structural member 1 has a certain curvature as shown in FIG. 13 and fails to have a sufficient rigidity, the deflection is significantly and effectively reduced by providing the closed cross-section structural member 4 outside the crossing portion. If the crossing portion of the structural member 1 has a certain curvature as shown in FIG. 13, the closed cross-section structural member 4 may be provided inside the crossing portion.

The second opening 10 in the sixth embodiment inevitably has a larger maximum width L than that in the first to fifth embodiments in which the closed cross-section structural member 4 is installed inside the crossing portion of the structural member 1. If the closed cross-section structural member 4 is installed outside the crossing portion of the structural member 1 as in the case of the sixth embodiment, the range of flattening effectively reducing the deflections y1 and y2 of the structural member 1 is preferably a flattening of at least 1.5 and not greater than 6.0. This is because a low degree of flattening (flattening of smaller than 1.5) is less effective for reducing deflection. In contrast, extreme flattening (flattening of greater than 6.0) is likely to subject the structural member 1 to lateral buckling or significant cross-sectional deformation. As described above, evidently, in the structure in which the closed cross-section structural member 4 is flattened along the structural member 1, the deflection of the structural member 1 is significantly reduced.

The preferred embodiments of the present invention have been described. However, the present invention is not limited to these embodiments. Obviously, those skilled in the art can conceive various variations and modifications without departing from the scope of the technical concepts described in the claims. It should be appreciated that these variations and medications naturally belong to the technical scope of the present invention.

For example, in a structure in which the structural member 1 varies in cross-sectional shape or dimension depending on the location thereon and in which the location on which a load acts lies away from the longitudinal center of the corresponding side of the structural member 1, the deflection of the structural member 1 can be effectively reduced by providing the closed cross-section structural member 4 with the different shapes and dimensions described above in the respective corners 2 of the structural member 1.

Furthermore, the closed cross-section structural member 4 and the structural member 1 do not depend on the type of the material thereof. The closed cross-section structural member 4 and the structural member 1 are applicable to any material such as a steel material, aluminum and its alloy, titanium and its alloy, magnesium and its alloy, and resin. Additionally, similar effects are obtained using processed, cast, or forged plate materials or tube materials. The present invention reduces the deflection by modifying the structures of the relevant members, and is thus effective on all the materials without depending on the chemical composition or mechanical properties of the material.

In addition, the shape of the closed cross-section structural member 4 is not particularly limited. Of course, similar effects are obtained using various shapes for the closed cross-section structural member 4 as shown in FIG. 14A, FIG. 14B, FIG. 15A, FIG. 15B, FIG. 16A, and FIG. 16B. The structure can be manufactured by processing the tube materials by means of pressing or hydroforming, or joining together at least two pieces resulting from division. Furthermore, of course, similar effects are obtained by manufacturing a closed cross-section structural member 4 integrated with the structural member 1, by means of a combination of hydroforming and cutting.

Figure 17A:
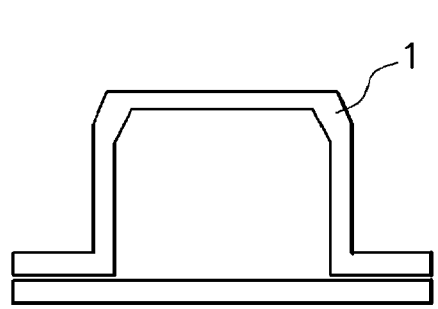
FIG. 17A is a cross-sectional view showing a variation of the frame-like structural member.
Figure 17B:
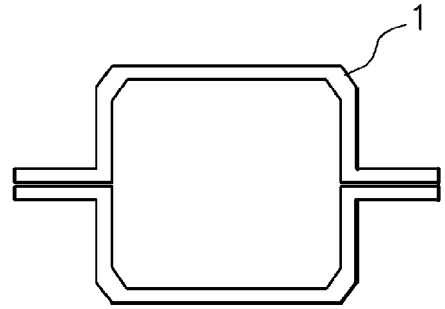
FIG. 17B is a cross-sectional view showing a variation of the frame-like structural member.

Additionally, the structural member 1 forming the structure is not limited to a hollow member with a rectangular cross section. Of course, similar effects are obtained using any of various shapes provided that the junction surface between the structural member 1 and the closed cross-section structural member 4 is flat. As shown in FIG. 17A and FIG. 17B, the structural member 1 may be manufactured by processing using an appropriate method, for example, hydroforming or by processing and manufacturing two members with a cross-sectional shape having three sides and outward protruding junction margins and joining the two members by means of spot welding or the like.

In addition, the present invention enables a reduction in the deflection of the structural member 1 even if the structural member 1 varies in thickness or cross-sectional shape along the length thereof.

EXAMPLES

Figure 18:
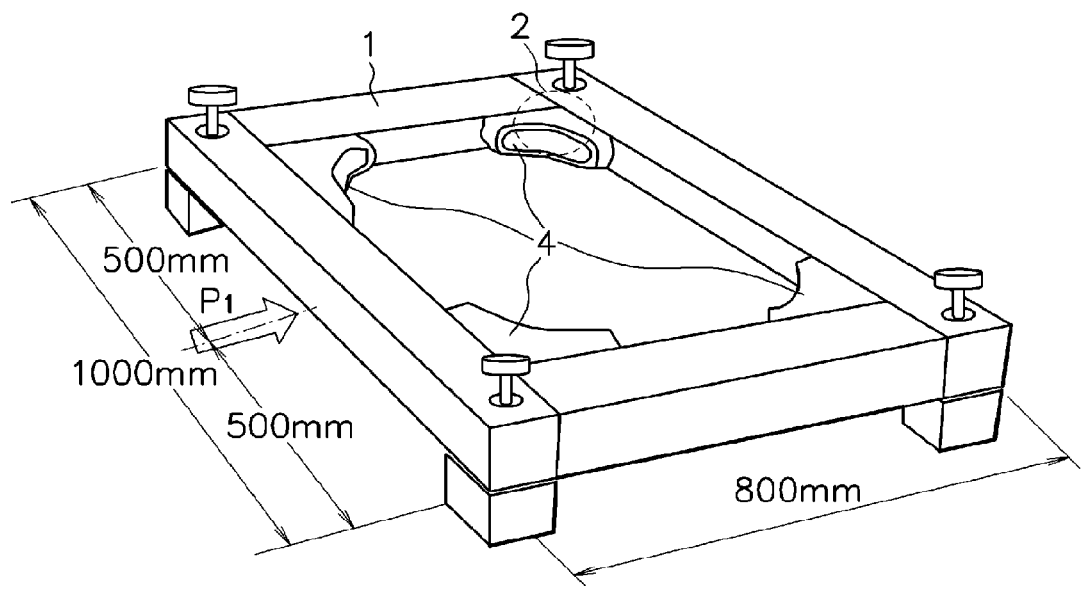
FIG. 18 is a diagram showing an example in which a load is imposed on a frame-like structure.
Figure 19:
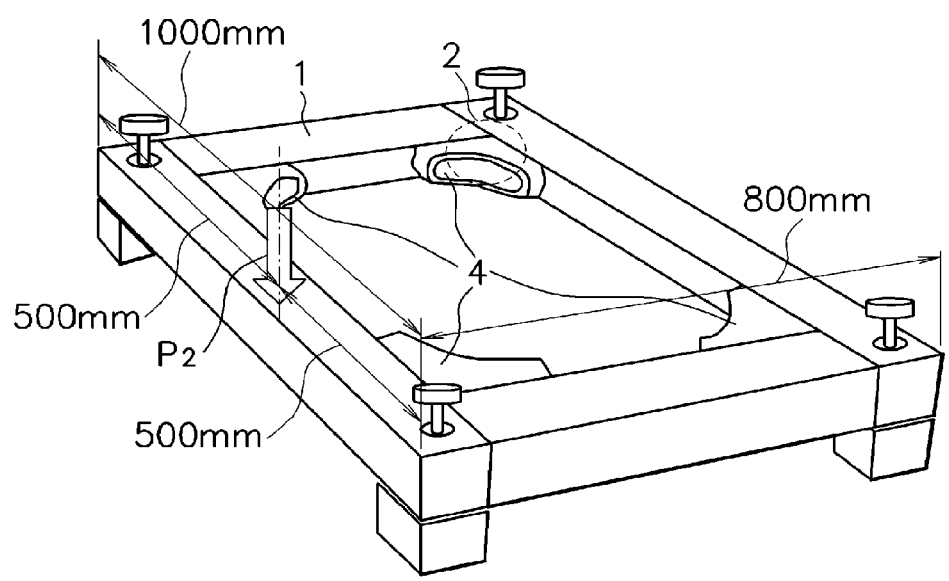
FIG. 19 is a diagram showing an example in which another load is imposed on the frame-like structure.

A structure was manufactured as follows by application of the present invention. As shown in FIG. 18 and FIG. 19, four hollow rectangular bars with a rectangular cross section were joined together into a quadrilateral shape by welding to form a structural member 1 configured like a frame (quadrilateral shape) with four sides. The closed cross-section structural member 4 was joined, by welding, to the inside of each of the four corners 2 as a reinforcing material. Then, a load $P_1$ of 1,000 kg shown in FIG. 18 and a load $P_2$ of 1,000 kg shown in FIG. 19 were imposed on the structure. The resultant deflection of the structural member 1 was measured. At this time, with the effects of rotational displacement of the corners 2 of the structural member 1 neglected, only the deflection of the structural member 1 caused by deformation was determined.

Furthermore, as a comparative example, two structures were manufactured; in one of the structures, one triangular rib 3 was joined to the inside of each of the corners 2 of the structural member 1 as a reinforcing plate, as shown in FIG. 20, and in the other structure, two triangular ribs 3 were joined to the inside of each of the corners 2 of the structural member 1 as reinforcing plates, as shown in FIG. 21. Load carrying tests were similarly conducted on these structures.

All of the structural members 1 and reinforcing plates (closed cross-section structural members 4 and triangular ribs 3) were formed of a steel material of board thickness 2.3 mm and a 780 MPa-class tensile strength.

The results are shown in FIG. 22 to FIG. 26. The "deflection reduction rate 1" in the examples of the present invention in the figures refers to the rate of a reduction in deflection with respect to the deflection in the case of one triangular rib; in this case, all the triangular ribs, used in the structure as reinforcing materials, are the same in the maximum width of the opening and in the length along the structural member 1. Furthermore, the "deflection reduction rate 2" in the examples of the present invention in the figures refers to the rate of a reduction in deflection with respect to the deflection in the case of two triangular ribs; in this case, all the triangular ribs, used in the structure as reinforcing materials, are the same in the maximum width of the opening, in the length along the structural member 1, and in the height of the reinforcing plate 3.

The following notes are added to FIG. 22 to FIG. 26.

*1: Indicates the length of a hypotenuse of the triangle if the reinforcing material is a triangular rib.

*2: Indicates the distance between the two triangular ribs plus the board thickness of the two triangular ribs if the reinforcing material is two triangular ribs.

*3: Indicates the distance between the two triangular ribs if the reinforcing material is two triangular ribs.

*4: Indicates the deflection of the center of the structural member subjected to a load $P_1$ of 1,000 kg.

*5: Indicates the rate of a reduction in the deflection under the load $P_1$ in the case of one triangular rib where all the triangle ribs, used in the structure as reinforcing materials, are the same in the length along the structural member.

*6: Indicates the rate of a reduction in the deflection under the load $P_1$ in the case of two triangular ribs where all the triangle ribs, used in the structure as reinforcing materials, are the same in the length along the structural member and in height.

*7: Indicates the deflection of the center of the structural member subjected to a load $P_2$ of 1,000 kg.

*8: Indicates the rate of a reduction in the deflection under the load $P_2$ in the case of one triangular rib where all the triangle ribs, used in the structure as reinforcing materials, are the same in the length along the structural member.

*9: Indicates the rate of a reduction in the deflection under the load $P_2$ in the case of two triangular ribs where all the triangle ribs, used in the structure as reinforcing materials, are the same in the length along the structural member and in height.

In the results shown in FIG. 22, nos. 102, 104, 106, 108, 110, 112, and 114 denote examples of the present invention in which the reinforcing material (closed cross-section structural member 4) is 70.8 mm in height and is thus smaller than the structural member 1 in height (nos. 102 and 114 denote reference examples). Compared to comparative examples for one triangular rib labeled nos. 1, 2, 3, 4, 5, 6, and 7 and in which the length of the closed cross-section structural member 4 along the each structural member 1 is the same as the length of the reinforcing plate 3 along the structural member 1, the examples of the present invention indicate a deflection reduction rate 1 of at least 5.5% for the load $P_1$ and a deflection reduction rate 1 of at least 5.7% for the load $P_2$. Furthermore, compared to comparative examples for two triangular ribs labeled nos. 101, 103, 105, 107, 109, 111, and 113 and in which the length of the closed cross-section structural member 4 along the each structural member 1 is the same as the length of the reinforcing plate 3 along the structural member 1, the examples of the present invention exhibit a deflection reduction rate 2 of at least 2.8% for the load $P_1$ and a deflection reduction rate 2 of at least 2.6% for the load $P_2$. The results indicate that the deflection was significantly reduced in all the cases.

Moreover, nos. 104, 106, 108, 110, 112, and 114 of the above examples, denote examples of the present invention which involve the closed cross-section structural member 4 with a flattening of greater than 1.0. Compared to the reference example labeled no. 102 and involving a flattening of not greater than 1.0, the above-described examples served to increase the deflection reduction rate 1 for the load $P_1$ by at least 2.3% and the deflection reduction rate 2 for the load $P_2$ by at least 1.0%.

Furthermore, particularly, examples of the present invention labeled nos. 108, 110, and 112 and involving a flattening of at least 1.5 and not greater than 3.0 exhibit a deflection reduction rate 1 of at least 12.4% for the load $P_1$ and a deflection reduction rate 1 of at least 14.8% for the load $P_2$. This indicates a significant deflection reduction effect.

As described above, the structure according to the present invention has proved to be effective for reducing the deflection of the structural member 1.

Next, in the results shown in FIG. 23, nos. 202, 204, 206, 208, 210, 212, and 214 denote examples of the present invention in which the reinforcing material (closed cross-section structural member 4) is 75.4 mm in height and is thus smaller than the structural member 1 in height (nos. 202 and 214 denote reference examples). Compared to the comparative examples for one triangular rib labeled nos. 1, 2, 3, 4, 5, 7, and 8 and in which the length of the closed cross-section structural member 4 along the each structural member 1 is the same as the length of the reinforcing plate 3 along the structural member 1, the examples of the present invention indicate a deflection reduction rate 1 of at least 6.1% for the load $P_1$ and a deflection reduction rate 1 of at least 9.5% for the load $P_2$. Furthermore, compared to comparative examples for two triangular ribs labeled nos. 201, 203, 205, 207, 209, 211, and 213 and in which the length of the closed cross-section structural member 4 along the each structural member 1 is the same as the length of the reinforcing plate 3 along the structural member 1, the examples of the present invention exhibit a deflection reduction rate 2 of at least 3.4% for the load $P_1$ and a deflection reduction rate 2 of at least 2.9% for the load $P_2$. The results indicate that the deflection was significantly reduced in all the cases.

Moreover, nos. 204, 206, 208, 210, 212, and 214 of the above examples, denote examples of the present invention which involve the closed cross-section structural member 4 with a flattening of greater than 1.0. Compared to the reference example labeled no. 202 and involving a flattening of not greater than 1.0, the above-described examples served to increase the deflection reduction rate 1 for the load $P_1$ by at least 2.5% and the deflection reduction rate 2 for the load $P_2$ by at least 1.5%.

Furthermore, particularly, examples of the present invention labeled nos. 208, 210, and 212 and involving a flattening of at least 1.5 and not greater than 3.0 exhibit a deflection reduction rate 1 of at least 13.3% for the load $P_1$ and a deflection reduction rate 1 of at least 15.8% for the load $P_2$. This indicates a significant deflection reduction effect.

As described above, the structure according to the present invention has proved to be effective for reducing the deflection of the structural member 1.

Moreover, in the results shown in FIG. 24, nos. 302, 304, 306, 308, 310, 312, and 314 denote examples of the present invention in which the reinforcing material (closed cross-section structural member 4) is 80.0 mm in height and is thus the same as the structural member 1 in height (nos. 302 and 314 denote reference examples). Compared to comparative examples for one triangular rib labeled nos. 2, 9, 4, 10, 5, 11, and 12 and in which the length of the closed cross-section structural member 4 along the each structural member 1 is the same as the length of the reinforcing plate 3 along the structural member 1, the examples of the present invention indicate a deflection reduction rate 1 of at least 10.2% for the load $P_1$ and a deflection reduction rate 1 of at least 13.2% for the load $P_2$. Furthermore, compared to comparative examples for two triangular ribs labeled nos. 301, 303, 305, 307, 309, 311, and 313 and in which the length of the closed cross-section structural member 4 along the each structural member 1 is the same as the length of the reinforcing plate 3 along the structural member 1, the examples of the present invention exhibit a deflection reduction rate 2 of at least 6.6% for the load $P_1$ and a deflection reduction rate 2 of at least 6.0% for the load $P_2$. The results indicate that the deflection was significantly reduced in all the cases. These deflection reduction rates are higher than those in nos. 102, 202, 104, 204, 106, 206, 108, 208, 110, 210, 112, 212, 114, and 214 denoting examples in which the length of the closed cross-section structural member 4 along the each structural member 1 is the same and in which the closed cross-section structural member 4 is smaller than the structural member 1 in height.

Moreover, nos. 304, 306, 308, 310, 312, and 314 of the above examples, denote examples of the present invention which involve the closed cross-section structural member 4 with a flattening of greater than 1.0. Compared to the reference example labeled no. 302 and involving a flattening of not greater than 1.0, the above-described examples served to increase the deflection reduction rate 1 for the load $P_1$ by at least 2.5% and the deflection reduction rate 2 for the load $P_2$ by at least 1.1%.

Particularly, examples of the present invention labeled nos. 308, 310, and 312 and involving a flattening of at least 1.5 and not greater than 3.0 exhibit a deflection reduction rate 1 of at least 20.5% for the load $P_1$ and a deflection reduction rate 1 of at least 22.7% for the load $P_2$. This indicates a significant deflection reduction effect.

As described above, the structure according to the present invention has proved to be effective for reducing the deflection of the structural member 1.

Furthermore, in the results shown in FIG. 25, nos. 402, 404, 406, 408, 410, 412, and 414 denote examples of the present invention in which the reinforcing material (closed cross-section structural member 4) is 84.6 mm in height and has an inner height of 80.0 mm, which is the same as the height of the structural member 1 (nos. 402 and 414 denote reference examples). Compared to comparative examples for one triangular rib labeled nos. 2, 13, 10, 14, 5, 11, and 15 and in which the length of the closed cross-section structural member 4 along the each structural member 1 is the same as the length of the reinforcing plate 3 along the structural member 1, the examples of the present invention indicate a deflection reduction rate 1 of at least 10.5% for the load $P_1$ and a deflection reduction rate 1 of at least 14.4% for the load $P_2$. Furthermore, compared to comparative examples for two triangular ribs labeled nos. 401, 403, 405, 407, 409, 411, and 413 and in which the length of the closed cross-section structural member 4 along the each structural member 1 is the same as the length of the reinforcing plate 3 along the structural member 1, the examples of the present invention exhibit a deflection reduction rate 2 of at least 6.9% for the load $P_1$ and a deflection reduction rate 2 of at least 7.1% for the load $P_2$. The results indicate that the deflection was significantly reduced in all the cases. These deflection reduction rates are higher than those in nos. 102, 202, 104, 204, 106, 206, 108, 208, 110, 210, 112, 212, 114, and 214 denoting examples in which the length of the closed cross-section structural member 4 along the each structural member 1 is the same and in which the closed cross-section structural member 4 has an inner height smaller than that of the structural member 1.

Moreover, nos. 404, 406, 408, 410, 412, and 414 of the above examples, denote examples of the present invention which involve the closed cross-section structural member 4 with a flattening of greater than 1.0. Compared to the comparative example labeled no. 402 and involving a flattening of not greater than 1.0, the above-described examples served to increase the deflection reduction rate 1 for the load $P_1$ by at least 2.2% and the deflection reduction rate 1 for the load $P_2$ by at least 2.5%.

Particularly, examples of the present invention labeled nos. 408, 410, and 412 and involving a flattening of at least 1.5 and not greater than 3.0 exhibit a deflection reduction rate 1 of at least 21.2% for the load $P_1$ and a deflection reduction rate 1 of at least 24.4% for the load $P_2$. This indicates a significant deflection reduction effect.

As described above, the structure according to the present invention has proved to be effective for reducing the deflection of the structural member 1.

In addition, in the results shown in FIG. 26, nos. 501, 502, 503, 504, 505, 506, and 507 denote examples of the present invention in which the reinforcing material (closed cross-section structural member 4) is 89.2 mm in height and has an inner height of 84.6 mm, which is greater than the height of the structural member 1 (nos. 501 and 507 denote reference examples). Compared to comparative examples for one triangular rib labeled nos. 2, 12, 13, 16, 5, 17, and 18 and in which the length of the closed cross-section structural member 4 along the each structural member 1 is the same as the length of the reinforcing plate 3 along the structural member 1, the examples of the present invention indicate a deflection reduction rate 1 of at least 1.6% for the load $P_1$ and a deflection reduction rate 1 of at least 3.3% for the load $P_2$. The results indicate that the deflection was significantly reduced.

Moreover, nos. 502, 503, 504, 505, 506, and 507 of the above examples, denote examples of the present invention which involve the closed cross-section structural member 4 with a flattening of greater than 1.0. Compared to the reference example labeled no. 501 and involving a flattening of not greater than 1.0, the above-described examples served to increase the deflection reduction rate for the load $P_1$ by at least 1.0% and the deflection reduction rate for the load $P_2$ by at least 1.1%.

Particularly examples of the present invention labeled nos. 504, 505, and 506 and involving a flattening of at least 1.5 and not greater than 3.0 exhibit a deflection reduction rate 1 of at least 4.4% for the load $P_1$ and a deflection reduction rate 1 of at least 5.2% for the load $P_2$. This indicates a significant deflection reduction effect.

As described above, the structure according to the present invention has proved to be effective for reducing the deflection of the structural member 1.

Another structure was manufactured by application of the present invention as follows. Four hollow rectangular bars with a rectangular cross section were joined together into a quadrilateral shape by welding to form a structural member 1 configured like a frame (quadrilateral shape) with four sides; this is not shown in the drawings. The closed cross-section structural member 4 was joined, by welding, to the outside of each of the four corners 2 as a reinforcing material (see FIG. 12). Load carrying tests were conducted on this structure as in the case of FIG. 18 and FIG. 19.

Additionally, as a comparative example, a structure was manufactured in which one L-shaped rectangular rib was joined to the outside of each of the corners 2 of the structural member 1 as a reinforcing plate. Load carrying tests were similarly conducted on this structure.

All of the structural members 1 and reinforcing plates (closed cross-section structural members 4 and L-shaped ribs) were formed of a steel material of board thickness 2.3 mm and a 780 MPa-class tensile strength.

The results are shown in FIG. 27. The "deflection reduction rate 1" in the examples of the present invention in the figures refers to the rate of a reduction in deflection with respect to the deflection in the case of one L-shaped rib; in this case, all the L-shaped ribs, used in the structure as reinforcing materials, are the same in the maximum width of the opening and in the length along the structural member 1. Notes *1 to *9 similar to those for FIG. 22 to FIG. 26 described above are added to FIG. 27.

In the results shown in FIG. 27, nos. 601, 602, 603, 604, 605, 606, 607, 608, 609, and 610 denote examples of the present invention in which the reinforcing material (closed cross-section structural member 4) is 80.0 mm in height and has an inner height of 75.4 mm, which is the same as the height of the structural member 1 (nos. 601, 610, and 611 denote reference examples). Compared to comparative examples for one L-shaped rib labeled nos. 19 to 29 and in which the length of the closed cross-section structural member 4 along the each structural member 1 is the same as the length of the reinforcing plate 3 along the structural member 1, the examples of the present invention indicate a deflection reduction rate 1 of at least 6.5% for the load $P_1$ and a deflection reduction rate 1 of at least 9.0% for the load $P_2$. The results indicate that the deflection was significantly reduced.

Moreover, nos. 602, 603, 604, 605, 606, 607, 608, 609, and 610 of the above examples, denote examples of the present invention which involve the closed cross-section structural member 4 with a flattening of greater than 1.0. Compared to the reference example labeled no. 601 and involving a flattening of not greater than 1.0, the above-described examples served to increase the deflection reduction rate 1 for the load $P_1$ by at least 2.4% and the deflection reduction rate 1 for the load $P_2$ by at least 2.5%.

Particularly, examples of the present invention labeled nos. 602, 603, 604, 605, 606, 607, and 608 and involving a flattening of at least 1.5 and not greater than 6.0 exhibit a deflection reduction rate 1 of at least 13.9% for the load $P_1$ and a deflection reduction rate 1 of at least 15.9% for the load $P_2$. This indicates a significant deflection reduction effect.

As described above, the structure according to the present invention has proved to be effective for reducing the deflection of the structural member 1.

INDUSTRIAL APPLICABILITY

The present invention is applied to, for example, an engine cradle on which an engine of a car is installed and a rear sub-frame provided in the rear of the car.

The invention claimed is:

1. A structure comprising:
a frame with four sides and four corners, and
a closed cross-section structural member attached by welding to at least one corner of the frame formed by a first end of a first side and a second end of a second side at an inner frame periphery along a flat surface of the first side and a flat surface of the second side,
wherein the closed cross-section structural member comprises:
a horizontal portion extending in an in-plane direction of the frame at a predetermined height position in a thickness direction of the frame, a first vertical portion connected first end of the horizontal portion, a second vertical portion connected second end of the horizontal portion, and a connection portion connecting the two vertical portions together, and the closed cross-section structural member comprises a first opening formed therein facing the flat surface of the first side and the flat surface of the second side and a second opening formed therein facing inside of the frame, wherein the second opening opens on a diagonal of the frame,
a part of an opening edge of the first opening corresponding at least to the two vertical portions is joined to the flat surface of the first side and the flat surface of the second side, and
a ratio of a maximum width of the second opening to a height of the closed cross-section structural member is greater than 1.0 and not greater than 3.0.

2. A structure comprising:
a frame with four sides and four corners, and
a closed cross-section structural member attached by welding to at least one corner of the frame formed by a first end of a first side and a second end of a second side at an outer frame periphery along a flat surface of the first side and a flat surface of the second side,
wherein the closed cross-section structural member comprises:
a horizontal portion extending in an in-plane direction of the frame at a predetermined height position in a thickness direction of the frame, a first vertical portion connected first end of the horizontal portion, a second vertical portion connected second end of the horizontal portion, and a connection portion connecting the two vertical portions together, and the closed cross-section structural member comprises a first opening formed therein facing the flat surface of the first side and the flat surface of the second side and a second opening formed therein facing outside of the frame, wherein the second opening opens on an extension line of a diagonal of the frame, a part of an opening edge of the first opening corresponding at least to the two vertical portions is joined to the flat surface of the first side and the flat surface of the second side, and a ratio of a maximum width of the second opening to a height of the closed cross-section structural member is greater than 1.0 and not greater than 6.0.

3. The structure according to claim 1, wherein the connection portion is joined to a top surface or a bottom surface of the frame.

4. The structure according to claim 2, wherein the connection portion is joined to a top surface or a bottom surface of the frame.

\* \* \* \* \*